United States Patent
Lynch et al.

(10) Patent No.: US 9,659,298 B2
(45) Date of Patent: May 23, 2017

(54) SYSTEMS AND METHODS FOR INFORMING VIRTUAL AGENT RECOMMENDATION

(71) Applicants: Timothy Lynch, North Reading, MA (US); Kenneth S. Harper, Hudson, NH (US); Carey Radebaugh, Brookline, MA (US)

(72) Inventors: Timothy Lynch, North Reading, MA (US); Kenneth S. Harper, Hudson, NH (US); Carey Radebaugh, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 219 days.

(21) Appl. No.: 13/710,678

(22) Filed: Dec. 11, 2012

(65) Prior Publication Data

US 2014/0164312 A1  Jun. 12, 2014

(51) Int. Cl.
*G06F 15/173* (2006.01)
*G06Q 30/00* (2012.01)
*H04M 3/493* (2006.01)
*H04M 7/00* (2006.01)
*G10L 15/18* (2013.01)

(52) U.S. Cl.
CPC ............ *G06Q 30/00* (2013.01); *H04M 3/493* (2013.01); *H04M 3/4938* (2013.01); *G10L 15/18* (2013.01); *H04M 7/0036* (2013.01)

(58) Field of Classification Search
CPC .. H04M 3/493; H04M 3/4938; H04M 7/0036; G10L 15/18; G10L 15/183
See application file for complete search history.

(56) References Cited

U.S. PATENT DOCUMENTS

| | | | |
|---|---|---|---|
| 6,466,654 B1 | 10/2002 | Cooper et al. | |
| 6,804,668 B1 | 10/2004 | Shambaugh et al. | |
| 7,286,990 B1 | 10/2007 | Edmonds et al. | |
| 7,415,100 B2 | 8/2008 | Cooper et al. | |
| 7,450,567 B1 | 11/2008 | Mamnani | |
| 8,566,394 B2 | 10/2013 | Wang et al. | |
| 8,787,553 B2 | 7/2014 | Fan et al. | |
| 8,930,815 B2 | 1/2015 | Moore | |
| 9,076,448 B2 | 7/2015 | Bennett et al. | |

(Continued)

FOREIGN PATENT DOCUMENTS

| JP | 2006-301972 A | 11/2006 |
|---|---|---|
| KR | 10-2012-042006 A | 5/2012 |

(Continued)

OTHER PUBLICATIONS

U.S. Appl. No. 13/710,897, filed Dec. 11, 2012, Lynch et al.

(Continued)

*Primary Examiner* — Arvin Eskandarnia
*Assistant Examiner* — Austin Moreau
(74) *Attorney, Agent, or Firm* — Wolf, Greenfield & Sacks, P.C.

(57) ABSTRACT

Systems, methods, and apparatus for use in connection with at least one virtual agent. In some embodiments, at least one virtual agent is programmed to: identify a relationship between at least two persons; and make a recommendation for the at least two persons based at least in part on the relationship between the at least two persons.

20 Claims, 7 Drawing Sheets

(56) References Cited

U.S. PATENT DOCUMENTS

| | | |
|---|---|---|
| 9,148,394 B2 | 9/2015 | Lynch et al. |
| 9,262,175 B2 | 2/2016 | Lynch et al. |
| 9,276,802 B2 | 3/2016 | Lynch et al. |
| 2003/0191689 A1 | 10/2003 | Bosarge et al. |
| 2005/0021330 A1 | 1/2005 | Mano |
| 2005/0223067 A1 | 10/2005 | Buchheit et al. |
| 2006/0143214 A1 | 6/2006 | Teicher |
| 2006/0200435 A1 | 9/2006 | Flinn et al. |
| 2006/0259555 A1 | 11/2006 | Hassounah et al. |
| 2007/0043687 A1 | 2/2007 | Bodart et al. |
| 2007/0214097 A1 | 9/2007 | Parsons et al. |
| 2007/0226034 A1 | 9/2007 | Khan |
| 2007/0233635 A1* | 10/2007 | Burfeind .............. G06Q 10/109 |
| 2007/0282621 A1* | 12/2007 | Altman .................. G06Q 10/10 705/319 |
| 2008/0189367 A1 | 8/2008 | Okumura |
| 2008/0201306 A1 | 8/2008 | Cooper et al. |
| 2008/0240379 A1* | 10/2008 | Maislos et al. ............ 379/88.13 |
| 2008/0247530 A1 | 10/2008 | Barton et al. |
| 2009/0018835 A1 | 1/2009 | Cooper et al. |
| 2009/0112782 A1* | 4/2009 | Cross ..................... G06Q 30/02 706/45 |
| 2009/0144143 A1 | 6/2009 | Iyer |
| 2009/0216848 A1 | 8/2009 | Slotznick |
| 2010/0094678 A1 | 4/2010 | Gupta et al. |
| 2010/0125592 A1 | 5/2010 | Dauginas et al. |
| 2010/0131996 A1 | 5/2010 | Gauld |
| 2010/0169486 A1 | 7/2010 | McCormack et al. |
| 2010/0174813 A1 | 7/2010 | Hildreth et al. |
| 2010/0226490 A1 | 9/2010 | Schultz et al. |
| 2011/0040756 A1 | 2/2011 | Jones et al. |
| 2011/0066630 A1* | 3/2011 | Balduccini et al. .......... 707/766 |
| 2011/0141919 A1 | 6/2011 | Singh et al. |
| 2011/0184937 A1 | 7/2011 | Jin et al. |
| 2011/0213642 A1 | 9/2011 | Makar et al. |
| 2011/0289428 A1 | 11/2011 | Yuen et al. |
| 2012/0016678 A1 | 1/2012 | Gruber et al. |
| 2012/0150580 A1 | 6/2012 | Norton |
| 2012/0150598 A1 | 6/2012 | Griggs |
| 2012/0239761 A1 | 9/2012 | Linner et al. |
| 2012/0265528 A1 | 10/2012 | Gruber et al. |
| 2012/0278736 A1 | 11/2012 | Tran et al. |
| 2012/0304079 A1 | 11/2012 | Rideout et al. |
| 2013/0006904 A1* | 1/2013 | Horvitz .................. G06Q 10/10 706/46 |
| 2013/0031476 A1 | 1/2013 | Coin et al. |
| 2013/0077775 A1 | 3/2013 | Fan et al. |
| 2013/0152092 A1 | 6/2013 | Yadgar |
| 2013/0173723 A1 | 7/2013 | Herold et al. |
| 2013/0275164 A1 | 10/2013 | Gruber et al. |
| 2014/0013240 A1* | 1/2014 | Ganesh .......................... 715/753 |
| 2014/0047001 A1 | 2/2014 | Phillips et al. |
| 2014/0059137 A1 | 2/2014 | Wang et al. |
| 2014/0164305 A1 | 6/2014 | Lynch et al. |
| 2014/0164317 A1 | 6/2014 | Lynch et al. |
| 2014/0164508 A1 | 6/2014 | Lynch et al. |
| 2014/0164509 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2015/0088514 A1* | 3/2015 | Typrin ..................... G06F 3/167 704/249 |
| 2015/0154976 A1* | 6/2015 | Mutagi ................. H04L 12/281 704/275 |
| 2016/0335532 A1* | 11/2016 | Sanghavi ................ G06N 3/006 |

FOREIGN PATENT DOCUMENTS

| | | |
|---|---|---|
| WO | WO 2006/129968 A1 | 12/2006 |
| WO | WO 2011/101527 A1 | 8/2011 |

OTHER PUBLICATIONS

U.S. Appl. No. 13/711,036, filed Dec. 11, 2012, Lynch et al.
U.S. Appl. No. 13/710,971, filed Dec. 11, 2012, Lynch et al.
U.S. Appl. No. 13/711,069, filed Dec. 11, 2012, Lynch et al.
U.S. Appl. No. 13/710,721, filed Dec. 11, 2012, Lynch et al.
U.S. Appl. No. 13/710,701, filed Dec. 11, 2012, Lynch et al.
U.S. Appl. No. 13/710,649, filed Dec. 11, 2012, Lynch et al.
International Search Report and Written Opinion for PCT/US2013/074121 mailed Mar. 31, 2014.
International Search Report and Written Opinion for PCT/US2013/054121 mailed Nov. 22, 2013.
U.S. Appl. No. 13/963,316, filed Aug. 9, 2013, Phillips et al.
International Preliminary Report on Patentability for Application No. PCT/US2013/074121 mailed Jun. 25, 2015.
Chen, Creating Context-Aware Software Agents, Lecture Notes in Computer Science: Innovative Concepts for Agent-Based Systems: First International Workshop on Radical Agent Concepts, Jan. 8-16, 2002, 2564:186-97, McLean, VA.
Newman, 5 Mobile Dating Apps, A Discover Company, Oct. 8, 2011, 1 page.
Extended European Search Report for EP Application No. 13861604.0 dated Apr. 20, 2016.
Shah, Modeling Human Group Behavior in Virtual Worlds [online], University of Central Florida. Nov. 2011. [Retrieved on Mar. 2, 2016]. Retrieved from the Internet: <URL:http://ial.eecs.ucf.edu/pfd/ShahPhD2011.pdf>;201 pages.

* cited by examiner

| Receipt ID | Date/Time | People | Category | Outcome | Status | Reviews |
|---|---|---|---|---|---|---|
| 1 | 05/15/12, 14:30 | A, B | Dining | Radius | Completed | B: Best burger in town. C: Overpriced. |
| 2 | 06/30/12, 09:15 | A | Gift | Snowboard | Completed | D: Best BD present ever. |
| 3 | 07/04/12, 21:45 | A, C | Sports | Bruins Game | Canceled | N/A |
| 4 | 07/16/12, 18:00 | A | Travel | US Airways | In Progress | N/A |

Data Store 500

FIG. 5

SYSTEMS AND METHODS FOR INFORMING VIRTUAL AGENT RECOMMENDATION

BACKGROUND

Some electronic devices such as smartphones and tablet computers include applications known as virtual agents. For example, the virtual agent Siri® is available on some devices from Apple Computers, Inc. and the virtual agent EVA (available from BulletProof Corp.) can be installed on devices running the Android™ mobile operating system developed by Google, Inc.

Some virtual agents are programmed to assist a user in performing various tasks. For example, a virtual agent may be programmed to send electronic messages, make appointments, place phone calls, and get directions. In completing such tasks, the virtual agent may interact with other applications (e.g., an email client) and may search for information either locally (e.g., from a user's electronic address book) or via one or more networks (e.g., from the World Wide Web, or the Web).

SUMMARY

Systems, methods and apparatus are provided for informing virtual agent recommendation.

In some embodiments, an apparatus is provided, comprising at least one processor programmed by one or more executable instructions to implement at least one virtual agent, the at least one virtual agent being programmed to: identify a relationship between at least two persons; and make a recommendation for the at least two persons based at least in part on the relationship between the at least two persons.

In some further embodiments, a method is performed by at least one processor implementing at least one virtual agent, the method comprising acts of: identifying a relationship between at least two persons; and making a recommendation for the at least two persons based at least in part on the relationship between the at least two persons.

In some further embodiments, at least one computer-readable medium is provided, having encoded thereon instructions that, when executed by at least one processor, perform a method for implementing at least one virtual agent, the method comprising acts of: identifying a relationship between at least two persons; and making a recommendation for the at least two persons based at least in part on the relationship between the at least two persons.

BRIEF DESCRIPTION OF DRAWINGS

The accompanying drawings are not necessarily drawn to scale. For purposes of clarity, not every component may be labeled in every drawing.

FIG. 5 shows an illustrative data store for storing receipts for virtual agent interactions, in accordance with some embodiments of the present disclosure.

DETAILED DESCRIPTION

Figure 1:
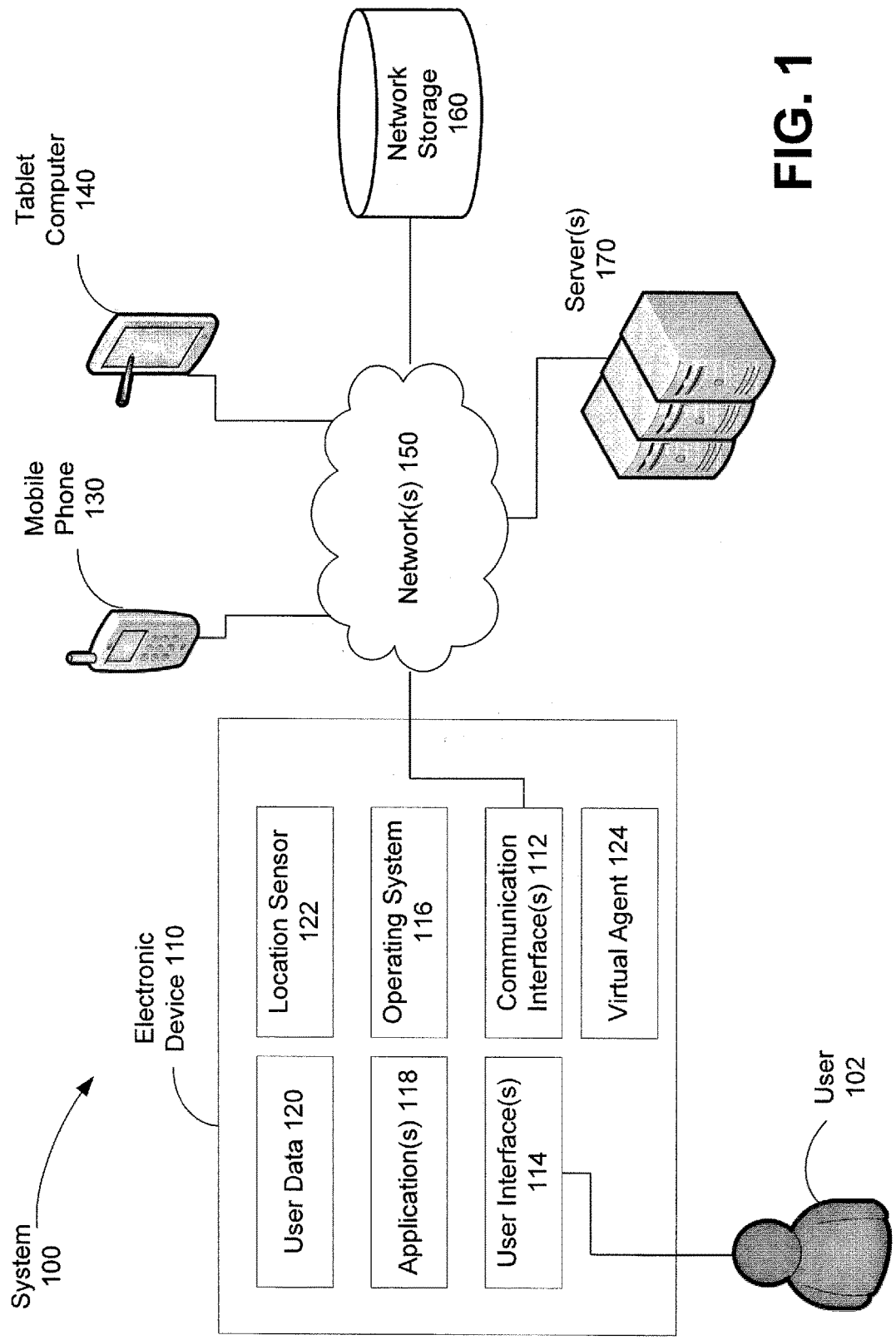
FIG. 1 shows an illustrative system in which the concepts disclosed herein relating to virtual agents may be implemented, in accordance with some embodiments.

The inventors have recognized and appreciated that conventional virtual agents are designed to interact with individual users in a one-on-one fashion. This paradigm assumes that a single user will invoke and provide input to a virtual agent, and that the virtual agent will interact with and perform a task for that same user. Indeed, a conventional virtual agent is sometimes referred to as a virtual "personal" assistant, which highlights the one-on-one nature of the interaction between the virtual agent and the user.

The inventors have further recognized and appreciated that the one-on-one paradigm may not be an ideal fit for some group activities, for example, where multiple persons share information and/or make collective decisions. In an illustrative scenario, a group of two or more friends may use Short Message Service (SMS) or Instant Messaging (IM) to plan the specifics of a gathering (e.g., meeting up at a bar, restaurant, club, etc.). Using a conventional virtual agent, one user would need to collect preferences from other members of the group and relay the collected preferences to the virtual agent outside the context of the group conversation. When the virtual agent returns a recommendation (e.g., for a restaurant), the user would need to relay the recommendation to the rest of the group. If the group approves, the user may again interact with the virtual agent outside the context of the group conversation to request that the virtual agent follow up on the recommendation (e.g., to make a reservation at the recommended restaurant).

Thus, the user must switch his focus back and forth between the group conversation (e.g., using the SMS or IM application) and the interaction with the virtual agent. This is awkward and inefficient, especially where the user is using the same device (e.g., a mobile phone) to interact with the virtual agent and to engage in the multiparty conversation, but only one application can run in the foreground at any given point in time (as is the case on many mobile devices). Additionally, the user must memorize or somehow record the preferences of the other group members to relay the preferences to the virtual agent, which is inefficient and error prone.

I. Virtual Agent Participation in Multiparty Conversation.

In accordance with some embodiments, a virtual agent may be directly invoked from a multiparty conversation, without requiring any participant to leave the conversation to invoke the virtual agent, thereby providing a seamless user experience and improved efficiency. For example, in some embodiments in which the multiparty conversation takes place via a group messaging application (non-limiting examples of which include SMS, IM, email and voice chat), a participant in the multiparty conversation may invoke a virtual agent within the context of the group messaging application. However, as discussed in greater detail below, the multiparty conversation may take place in ways other than via a group messaging application, as aspects of the present disclosure relating to invoking a virtual agent from a multiparty conversation are not limited to any particular medium in which the multiparty conversation is conducted.

In some embodiments, any of the participants in a multiparty conversation may invoke a virtual agent. In other embodiments, only some, but not all, of the participants may do so. As one non-limiting example, only a participant associated with a virtual agent in some appropriate manner may invoke the virtual agent. Various ways in which a participant may be associated with a virtual agent are discussed in detail below.

In some embodiments, invocation of a virtual agent from a multiparty conversation may cause the virtual agent to be injected into the conversation as an additional participant. In some such embodiments, multiple users in the group may interact with the virtual agent within the context of the multiparty conversation, for instance, by providing inputs to the virtual agent to specify a task to be performed by the virtual agent. For example, the virtual agent may be asked to make a recommendation for the group (e.g., for a restaurant, shop, movie, etc.) and multiple users in the group may inform the virtual agent of their preferences. In this manner, none of the users is required to serve as an exclusive conduit between the group and the virtual agent.

In other embodiments, a virtual agent may be injected into a multiparty conversation to present the result of a task performed by the virtual agent, even if the request to perform the task was issued outside the context of the conversation. For example, a user (who may or may not be a participant in a conversation) may invoke the virtual agent to gather information and/or make a recommendation for multiple participants in the conversation. Once invoked, the virtual agent may inject itself into the conversation to present the requested information and/or recommendation to the participants.

While in various illustrative embodiments a virtual agent may be injected into a multiparty conversation upon invocation, it should be appreciated that aspects of the present disclosure relating to the invocation of a virtual agent are not so limited. In alternative embodiments, the virtual agent may be invoked from a multiparty conversation but may perform a requested task outside the context of the multiparty conversation and/or present results of the task in ways other than being injected as a participant in the multiparty conversation. For example, the virtual agent may be invoked from the multiparty conversation to make a restaurant reservation and may provide the details of the reservation in ways other than via the multiparty conversation. In some further embodiments discussed below, a virtual agent may also be invoked outside the context of a multiparty conversation to make a recommendation for multiple persons.

II. Virtual Agent Recommendation for Multiple Persons.

In accordance with some embodiments, a virtual agent may be programmed to use information regarding multiple persons to inform a recommendation, irrespective of whether the persons are participating in a multiparty conversation. For example, a user may request a recommendation that relates to multiple persons (e.g., a recommendation for a social gathering or activity), and the virtual agent may be programmed to take into account those persons' preferences and/or restrictions in selecting the recommendation. Such preferences and/or restrictions may relate to location, scheduling, cost, and/or any other aspects of the recommendation. Other types of information regarding the persons may also be used by the virtual agent, such as age, gender, occupation, location, or any other information that may influence the recommendation.

In some embodiments in which a virtual agent is injected into a multiparty conversation, the virtual agent may glean information from portions of the conversation that took place before the invocation of the virtual agent and/or portions that take place after the invocation. For instance, in a restaurant search example, a first user may express a preference for a particular location prior to invoking the virtual agent, while a second user may ask the virtual agent to limit the restaurant search to a certain price range after the virtual agent has been injected into the conversation. Additionally, in performing a task, a virtual agent may be programmed to solicit further information from multiple users.

In some embodiments, the virtual agent may combine the use of preference information for one or more users with the use of information gleaned from the conversation in making a recommendation, but not all embodiments are limited in this respect, as these techniques may be used separately in some embodiments. These and other embodiments are described in detail below.

III. Techniques for Invoking Virtual Agent.

A virtual agent may be invoked in any suitable manner to perform a task for one or more persons. In accordance with some embodiments, a process may monitor a conversation taking place over a messaging application and listen for a "trigger," which may be a word or phrase designated for invoking a virtual agent. Upon detecting the trigger, the process may invoke the virtual agent, for example, by injecting the virtual agent into the conversation.

The process that monitors the conversation may be the messaging application itself, or some other process that is given access to one or more portions of the conversation content in some suitable manner. In some embodiments, the process may execute on a user device via which a participant participates in the conversation. In alternative embodiments, the process may execute on a server, such as a server handling the communication traffic associated with the messaging application, or a separate server to which one or more portions of the conversation content is forwarded.

In some further embodiments, a process may intercept user input to a messaging application and determine whether the user input includes a trigger that is designated for invoking a virtual agent. For example, the process may be programmed to intercept input from various types of input devices (e.g., keyboard, mouse, touchscreen, hardware buttons, etc.) on a device used by a conversation participant to detect the designated trigger. In some embodiments, the process may also be programmed to access speech input by intercepting text output by an ASR engine as a result of transcribing captured user speech. Upon detecting the designated trigger (which may be in the form of a keystroke, mouse click, touchscreen gesture, button press, speaking or typing a trigger word or phrase, etc., or any suitable combination thereof), the process may invoke the virtual agent, for example, by injecting the virtual agent into a conversation taking place over the messaging application.

In some further embodiments, a virtual agent may be invoked on a device in response to input received from another device. For example, a first device having virtual agent capability may receive from a second device a communication and invoke a virtual agent upon detecting a designated trigger in the communication. The communication may be received via a messaging application (e.g., SMS, IM, email, voice chat, etc.), via telephone, or in any other suitable way. In this manner, even if the second device does not have virtual agent capability, a user of the second device may be able to take advantage of the virtual agent capability of the first device.

IV. User Interface Presentation of Virtual Agent.

In accordance with some embodiments, a virtual agent may be presented as a participant in a multiparty conversation. The virtual agent may interact with one or more other participants within the context of the conversation, for example, by prompting for and/or providing information. In some embodiments, the virtual agent's contributions (e.g., prompts, information, etc.) may be presented in the same manner as contributions from the other participants. For example, the virtual agent may be associated with a user name, and the virtual agent's contributions may be labeled with that user name. In alternative embodiments, the virtual agent's contributions may be presented in a manner that distinguishes the virtual agent from the other participants. For example, the virtual agent's contributions may be presented in one area of a visual display, whereas the other participants may be presented in a different area of the display. Other ways of distinguishing the virtual agent from the other participants are also possible, and some additional illustrative examples are discussed in greater detail below.

V. Techniques for Providing Input to Virtual Agent.

In accordance with some embodiments, a virtual agent may be programmed to use a record of a multiparty conversation in formulating a task to be performed and/or in performing the task. For instance, in some embodiments, the virtual agent may be programmed to analyze what was communicated by the participants in the conversation (e.g., during an IM session) prior to the virtual agent being invoked to determine or interpret what the virtual agent is asked to do for the participants. As one non-limiting example, a group of four friends may have been discussing where to meet for dinner on Friday, and the virtual agent may be programmed to infer from the discussion the task of recommending a restaurant with a table for four available on Friday evening. In some further embodiments, the virtual agent may be programmed to glean from the conversation history information that may be relevant for the requested task. For instance, in the above restaurant recommendation example, the virtual agent may be programmed to analyze the conversation history to determine whether the participants indicated any preferences for location, time, type of cuisine, price range, etc., or anything else that may inform the virtual agent's recommendation. As discussed above, in some embodiments, the virtual agent may further use preference information for one or more of the participants in formulating the recommendation.

A virtual agent may use a record of a multiparty conversation irrespective of whether the virtual agent is injected into the conversation. In some embodiments, the virtual agent may be injected into the conversation to interact with one or more participants, for example, to prompt for additional information to further define the requested task and/or to provide a recommendation or result of a task to the participants in the conversation. In alternative embodiments, the virtual agent may perform the requested task entirely outside the context of the conversation (e.g., after the conversation has concluded).

Furthermore, a virtual agent may use a record of a multiparty conversation irrespective of whether the virtual agent was invoked by a participant of the conversation. In some embodiments, the virtual agent may be invoked by a user who did not participate in the conversation to make a recommendation for one or more participants in the conversation. As one non-limiting example, the user may provide to the virtual agent an email string between two or more other people that was forwarded to the user. Other types of conversation records (e.g., SMS string, IM log, voice call transcript, etc.) may also be used, as the present disclosure is not limited to use with any particular type of conversation records.

In accordance with some embodiments, a virtual agent may be programmed to use an activity history of a user in formulating a task to be performed and/or in performing the task. Activities of the user prior to invoking the virtual agent may provide contextual information to the virtual agent. For example, in some embodiments, the virtual agent may be programmed to analyze content recently accessed by the user (e.g., within 5 minutes, 10 minutes, 15 minutes, 30 minutes, one hour, etc. prior to invoking the virtual agent) to determine or interpret how the virtual agent may assist the user. As one non-limiting example, upon being invoked by the user to make a restaurant recommendation, the virtual agent may analyze restaurant reviews recently accessed by the user in an attempt to infer what type of food the user may be interested in. Other types of user activities may also be taken into account by the virtual agent, such as the user making a particular calendar appointment, calling a particular acquaintance, making a particular purchase, etc.

In accordance with some embodiments, a virtual agent may be programmed to use a record of a prior virtual agent interaction to facilitate formulating a task to be performed and/or performing the task. In an illustrative scenario, a user may wish to invoke the virtual agent to modify one or more aspects of a previously performed task. For instance, the user may have previously invoked the same virtual agent or a different virtual agent to recommend a restaurant in a certain neighborhood and may later wish to change to a different neighborhood, while all other details (e.g., date, time, type of food, list of attendees, etc.) remain the same. Accordingly, in some embodiments, the user may provide a record of the previous interaction to the virtual agent, with an additional instruction to change the location. In this manner, the user may be able to leverage a prior interaction with the virtual agent and need not recreate or manually input all information to be provided to the virtual agent.

It should be appreciated that the virtual agent may be programmed to analyze any suitable types of records of previous interactions, such as a full discussion thread between the virtual agent and one or more users, or an abridged version containing the virtual agent's previous recommendation and/or one or more pieces of salient information. Examples of types of records that may be stored and used to "restart" the virtual agent are discussed in greater detail below.

VI. Techniques for Informing Virtual Agent Recommendations.

In accordance with some embodiments, a virtual agent may be programmed to use a relationship between at least two persons to inform a recommendation. For instance, in response to a request to make a recommendation for multiple persons, the virtual agent may be programmed to determine whether the persons are friends, relatives, business acquaintances, etc., and use the determined relationship to inform one or more aspects of the recommendation. For instance, in the restaurant search example discussed above, the virtual agent may be programmed to select an appropriate type of restaurant based on the determined relationship, such as an elegant restaurant for a business dinner, a romantic restaurant for a husband-and-wife dinner, not trendy or loud restaurants for a mother-and-son dinner, etc.

In accordance with some embodiments, a virtual agent may be programmed to use location information of one or more persons to inform a recommendation. As one non-limiting example, the virtual agent may be programmed to obtain location information (e.g., Global Positioning System, or GPS, coordinates) for multiple persons in a group and use that information to select a gathering place in any suitable way, for example, one that is centrally located, one that is conveniently located for as many persons as possible (e.g., as determined based on whether the gathering place is at most a threshold distance from each person in the group), etc.

In accordance with some embodiments, a virtual agent may be programmed to use information regarding a person other than the user(s) who invoked the virtual agent to inform a recommendation. Any information regarding such a person may be used, examples of which include likes, dislikes, physical characteristics, personality, education, occupation, etc., or any suitable combination thereof. For example, a user may invoke the virtual agent to recommend a birthday present for his mother, and may provide as input to the virtual agent one or more pieces of information regarding his mother, such as age, preferences, hobbies, etc.

In accordance with some embodiments, a virtual agent may be programmed to use location information of a person other than the user(s) who invoked the virtual agent to inform a recommendation. As one non-limiting example, a user may be on his way to a dinner party at a friend's house and may ask the virtual agent to find a wine store between his current location (e.g., based on current GPS coordinates) and the destination (e.g., based on the friend's home address).

The virtual agent may access information regarding one or more relevant persons in any suitable way. For example, in some embodiments, such information may be provided to the virtual agent by the user(s) who invoked the virtual agent. Alternatively, the virtual agent may be programmed to obtain such information from one or more other sources. For example, in some embodiments, the virtual agent may be programmed to access information stored locally on a user's device, such as scheduling and contact information stored by a calendar application, user preference information stored by the virtual agent or some other application, web browsing history, etc. In some embodiments, the virtual agent may be further programmed to access information from a remote device via one or more networks. For example, in some embodiments, preference information may be collected from a third party service provider (e.g., a social network site that allows users to review products and/or services).

In accordance with some embodiments, a virtual agent may be programmed to maintain a profile for a user. The profile may store information that may be used by the virtual agent in interactions with the user. Any suitable type of information may be stored, such as information derived from the virtual agent's prior interactions with the user (e.g., preferences expressed by the user, decisions made by the user, information requested by the user to make certain types of decisions, etc.), information collected from a third party service provider, or any other information that may be useful to the virtual agent in formulating a task to be performed for the user or in performing the task. As one non-limiting example, the user may authorize the virtual agent (e.g., by providing the necessary credentials such as user name and password) to pull information from the user's account with a third party service provider (e.g., Facebook®, Yelp®, OpenTable®, Rotten Tomatoes®, etc.). The virtual agent may learn the user's preferences based on information retrieved from such an account (e.g., reviews written by the user regarding restaurants, products, movies, etc.) and update the user's profile accordingly. To ensure accuracy of the information in the profile, in some embodiments the user may be allowed to review the updates entered by the virtual agent and make any desired adjustments.

VII. Techniques for Storing a Record of Virtual Agent Interaction.

The inventors have further recognized and appreciated that conventional systems do not maintain any record of interactions between a virtual agent and a user. Upon completion of a task, the user simply suspends or exits from the virtual agent. No record is saved that identifies the task as involving the virtual agent. For instance, no record is saved that indicates the virtual agent made a particular recommendation, nor is a record saved for the information exchanged between the virtual agent and the user in formulating and/or performing the task.

In accordance with some embodiments, a record may be stored for an interaction between a virtual agent and one or more users. As a result, if a user at some future time wishes to recall some aspect of an interaction with a virtual agent, a record for that interaction may be identified and retrieved. In an illustrative scenario, the user may wish to forward the virtual agent's recommendation to a friend. In another illustrative scenario, the user may wish to perform a similar task, but with one or more variations. For example, the user may wish to find a restaurant for the same group of friends at similar time and place as a previous gathering, except the group would like to try a different type of cuisine. Having a record of the prior interaction may facilitate the virtual agent making a recommendation. For instance, in some embodiments, the user may modify the record of the previous interaction (e.g., by adding, modifying, and/or removing information) and provide the modified record to the virtual agent to request a new recommendation, without having to recreate the interaction or otherwise manually input all information desired to be provided to the virtual agent. As one non-limiting example, the user may remove a terminal portion of the record to "restart" the interaction with the virtual agent at any desired point.

The record of a prior interaction may be of any suitable form. In accordance with some embodiments in which the virtual agent is injected into a conversation, a full discussion thread (e.g., SMS string, IM log, email string, voice chat transcript, etc.) may be stored including everything contributed by every human participant as well as the virtual agent. Such a history may be stored by the messaging application via which the conversation took place, separately by the virtual agent, or via some other suitable process.

It should be appreciated that the embodiments relating to storing a record of an interaction with a virtual agent and/or a record of a virtual agent action are not limited to use with a multiparty conversation, or even a multiparty virtual agent action. In some embodiments, a record of an interaction between a single user and a virtual agent and/or a record of a virtual agent action for a single user may be stored.

In accordance with some embodiments, a receipt may be stored in addition to, or instead of, a full interaction history with a virtual agent. The receipt may include any suitable information relating to an interaction between a virtual agent and one or more users. In one example, the receipt may identify the interaction as involving the virtual agent. Additionally, the receipt may include other identifying information (e.g., date and time of the interaction, user name or identifier for at least one user who participated in the interaction, etc.) and an indication of an outcome of the interaction (e.g., a recommendation made by the virtual agent). In some further embodiments, the receipt may include information provided by at least one person, such as a review of a recommendation made by the virtual agent. The review may be provided by a person who may or may not have participated in the interaction that led to the recommendation. Other types of information may also be stored in a receipt, as the present disclosure is not limited in this respect.

In accordance with some embodiments in which a receipt for a virtual agent interactions is stored separately from a full interaction history, a link may be created between the receipt and the full interaction history to indicate that the receipt and the full history both relate to the same interaction with the virtual agent. As one non-limiting example, the virtual agent may store a receipt for an interaction with a link to a conversation history separately stored by a messaging application via which the interaction took place. This may facilitate the user retrieving information relating to past interactions with the virtual agent. For instance, in some embodiments, the user is able to search the receipts to identify a particular interaction and use the link stored with the identified receipt to retrieve the corresponding full conversation history. Because full conversation histories may contain more noise (i.e., irrelevant information) than receipts, it may be more efficient and/or accurate to search the receipts. However, not all embodiments are limited in this respect, and some may enable searching the full conversation histories instead of or in addition to the receipts.

In accordance with some embodiments, a receipt for a virtual agent interaction may be used to communicate information to a relevant person. For example, a user may interact with a virtual agent to request a recommendation for one or more persons (e.g., for a social gathering), and may give each relevant person access to a receipt of the interaction to inform him of the specifics of the recommendation (e.g., location, time, dress code, attendee list, etc.). This may be done in any suitable manner, for example, by sending a copy of the receipt to the person, by sending a link to the receipt to the person, or in any other suitable way.

In some further embodiments, information stored in a receipt may be updated in real time to keep one or more people apprised of the status of one or more ongoing activities. For instance, in the restaurant search example discussed above, an Estimated Time of Arrival (ETA) may be maintained for one or more attendees and made available to a person who may (although need not) also be an attendee. The ETA for any attendee may be calculated based at least in part on a current location of the attendee and the location of the restaurant recommended by the virtual agent. In this manner, any attendee may find out when to expect another attendee by calling up a most up-to-date copy of the receipt.

The restaurant example discussed above is merely illustrative, as ETA may be used in any suitable context (e.g., business meetings, classes, parties, etc.). Furthermore, ETA is just one example of useful information that may be updated in a receipt. Other types of information may be stored and updated instead of or in addition to ETA. Non-limiting examples of such information include location information (e.g., conference room number for a meeting), attendee status information (e.g., who accepted or rejected the invitation to attend a meeting), weather information, etc.

Further still, ETA and/or other useful information relating to a virtual agent interaction may be stored and updated in ways other than via a receipt, as aspects of the present disclosure relating to updating information are not so limited.

VIII. Collaboration Between Multiple Virtual Agents.

In accordance with some embodiments, multiple virtual agents may interact with each other in formulating a task to be performed and/or in performing the task. For instance, in some embodiments, each virtual agent may be associated with a different user in the group and may execute on a different device associated with the respective user. In this manner, each virtual agent may have access to various types of information regarding the respective user, such as contact information (e.g., physical addresses, phone numbers, email and/or other virtual addresses, etc.), location information (e.g., present location, recently visited locations, e.g., as determined based on a threshold length of time, frequently visited locations, e.g., as determined by a threshold number of visits during a certain time interval, etc.), preference information (e.g., gleaned from activity histories, reviews, etc.), and/or any other suitable information.

In some embodiments, the virtual agents may be programmed to share information with each other within constraints set by the respective users. Such constraints may be established for privacy reasons or any other reason. For example, a user may wish to share different types of information with different groups of people. In some embodiments, the user may make certain information (e.g., preference and/or location information) available to a group only if all members of the group belong to a trusted circle of friends, or by applying any other desired constraint.

In some further embodiments, the virtual agents may be programmed to collaborate with each other in formulating a task to be performed and/or in performing the task, regardless of how much information the virtual agents share with each other. For instance, in making a recommendation, the virtual agents may be programmed to negotiate with each other to reach a compromise based on the respective users' preferences and/or constraints. In conducting such a negotiation, a virtual agent may make a proposal to other virtual agents, or accept or reject a proposal made by another virtual agent, with or without divulging to the other virtual agents the underlying information used by the virtual agent to make, accept, or reject the proposal.

In some further embodiments, the virtual agents may be programmed to collaborate with each other in formulating a task to be performed and/or in performing the task, regardless of whether the task arose from a multiparty conversation. For instance, in some embodiments, a virtual agent associated with a first user may (e.g., upon the first user's request) obtain information regarding a second user from a virtual agent associated with the second user. Any suitable types of information may be obtained in this manner. As one non-limiting example, the virtual agent associated with the first user may request from the virtual agent associated with the second user location and/or ETA information regarding the second user, even if neither virtual agent has assisted in arranging the meeting between the first and second users.

In accordance with some embodiments, multiple virtual agents running on different devices may interact with each other in formulating a task to be performed and/or in performing the task, irrespective of whether the task is performed for a single user or for multiple users. As one non-limiting example, a virtual agent running on a user device may interact with a virtual agent running on a server (e.g., in the cloud), for example, by forwarding information to and receiving a recommendation from the server-side virtual agent. The server-side virtual agent may interact with a single client-side virtual agent (e.g., when making a recommendation for a single user) or multiple client-side virtual agents (e.g., when making a recommendation for multiple users), as aspects of the present disclosure relating to multiple virtual agents collaborating with each other are not limited to any particular arrangement among the virtual agents.

IX. Detailed Discussion of Illustrative Embodiments.

It should be appreciated that the concepts introduced above and discussed in greater detail below may be implemented in any of numerous ways, as the disclosed concepts are not limited to any particular manner of implementation. Some illustrative implementations are described below. However, subject matter disclosed herein is not limited to the particular implementations shown in the various figures and described below, as other implementations are also possible. The below examples of specific implementations and applications are provided solely for illustrative purposes.

FIG. 1 shows an illustrative system 100 in which the concepts disclosed herein may be implemented. The system 100 is merely illustrative, as the concepts disclosed herein are not limited to being implemented on the system 100 and can be implemented on any suitable computer system. The system 100 includes an electronic device 110, which may be a mobile phone, a tablet computer, a laptop computer, a desktop computer, or any other computing device. The system 100 may also include any number of additional electronic devices with which the device 110 may communicate. In the example shown in FIG. 1, the system 100 includes a mobile phone 130 and a tablet computer 140, but these devices are merely illustrative.

The electronic device 110, the mobile phone 130, and the tablet computer 140 may be configured to communicate with each other via one or more network(s) 150. For example, the electronic device 110 may include one or more communication interface(s) 112 configured to transmit and/or receive data via the network(s) 150. Any suitable communication protocol or combination of communication protocols may be used, as aspects of the present disclosure are not limited to use with any particular network implementation, and can be used with any type of network(s).

In the example shown in FIG. 1, the electronic device 110 may be configured to receive input from and/or provide output to a user 102 via one or more user interface(s) 114. The user interface(s) 114 may include a keyboard interface, a touchscreen interface, a speech interface, any combination thereof (e.g., a multimodal interface), and/or any other user interfaces. For example, a touchscreen interface may be used to present various user interface elements such as buttons, menus, scrollbars, etc., and may be configured to recognize various touchscreen gestures. The touchscreen interface may also be used to emulate a keyboard interface. As another example, the user interface(s) 114 may include a microphone for capturing user speech, and the captured speech may be processed by an automatic speech recognition (ASR) engine (not shown) configured to convert input speech into text. As another example, the user interface(s) 114 may include a speaker to play audio such as recorded or synthesized speech.

In some embodiments including a speech interface, the ASR engine may reside on the electronic device 110 so that speech recognition processing can be performed locally. In other embodiments, the ASR engine may be located remotely from the electronic device 110. For example, the ASR engine may receive input speech from the electronic device 110 via the network(s) 150 or some other suitable communication medium, and may transmit recognition results to the electronic device 110 in the same or a different communication medium. In some further embodiments, the electronic device 110 may be associated with one or more local ASR engines and one or more remotely-located ASR engines, where some portion(s) of the speech input is processed by the one or more local ASR engines and some other portion(s) of the speech input is processed by the one or more remotely-located ASR engines. Examples of such distributed ASR systems are known by those of skill in the art.

In some embodiments, an ASR engine may be configured to recognize speech input using one or more fixed or dynamically-generated grammars and/or vocabularies. The grammars and/or vocabularies may be general or context-dependent (e.g., specific to an application for which the speech input is directed). In alternative embodiments, an ASR engine may be configured to recognize free-form speech input to allow a user to interact with an application in a natural way. For example, the ASR engine may be configured to recognize anything the user says using natural language understanding (NLU) techniques (e.g., using a statistical NLU model). Although various natural language processing and ASR techniques are described herein, it should be appreciated that these techniques are merely illustrative, as any suitable natural language processing and ASR techniques and combinations thereof may be used in connection with various embodiments of the present disclosure.

The user interface(s) 114 may provide output to a user in one or more different modes, such as visual, audible, and/or tactile. For example, the user interface(s) 114 may be capable of displaying text and/or graphical images to the user. As another example, the user interface(s) 114 may be capable of rendering an audible signal (e.g., synthesized and/or recorded speech) and/or a tactile signal. Any suitable combination of input and/or output modes may be used, as aspects of the present disclosure are not limited to any particular mode of interaction with the user.

In the example shown in FIG. 1, the electronic device 110 includes an operating system 116 and one or more application(s) 118. Some of the application(s) 118 may be installed locally on the electronic device 110. As one non-limiting example, a calendar application may execute locally on the electronic device 110 and may allow a user to store scheduling information about events and/or appointments. Data associated with a locally executing application may be stored locally on the electronic device 110, for example, as part of user data 120. Alternatively, some or all of the data handled by an application may be stored remotely, for example, at a network storage 160 accessible via the network(s) 150.

In some embodiments, the application(s) 118 may include an application that is hosted by one or more remote computers but can be accessed by a user via the electronic device 110. For example, a user may use a web browser running on the electronic device 110 to access a web-based application (e.g., a web-based email application or other type of web-based application) hosted by one or more remote server(s) 170. As another example, a remote access protocol may allow a user to interact with an application running on the remote server(s) 170 via a user interface rendered locally on the electronic device 110.

In some further embodiments, the electronic device 110 may include a location sensor 122 configured to determine a current location of the electronic device 110. Such location information may be used in a number of different ways. For example, it may be used by a mapping application programmed to display the current location of the electronic device 110 on a map to make a recommendation for a restaurant, store, attraction, etc. within the proximity of the current location, or for any other suitable purpose. The location sensor 122 may be a GPS sensor configured to determine GPS coordinates for the current location of the electronic device 110, or any other type of location sensor. The reference to a location sensor and possible uses thereof is merely illustrative, as other types of sensors and/or uses thereof are also possible.

In some embodiments, the electronic device 110 may store user data 120. Any user data may be stored, examples of which include contact information (e.g., phone numbers, physical addresses, email addresses, etc.), calendar information (e.g., appointment information, event information, birthdays, etc.), user preference information (e.g., preferences for food, movies, music, etc.), media content information (e.g., music, movies, photos, etc.), behavioral history information (e.g., web browsing history, past purchases, etc.), location information (e.g., current location, home location, work location, etc.), or other suitable information. In some embodiments, the user data 120 may be associated with a particular user of the electronic device 110. For example, the electronic device 110 may be used primarily by a single user (e.g., the user 102) so that only one set of user data may be maintained. Alternatively, the electronic device 110 may be shared by multiple users, and a separate set of user data may be maintained for each user.

In some embodiments, at least some of the user data 120 may be stored remotely from the electronic device 110 at a location that is accessible via the network(s) 150. For example, at least some of the user data 120 may be stored in the network storage 160 (e.g., in the cloud) accessible from the electronic device 110 or on any other suitable device. However, it should be appreciated that the user data 120 may be stored at any one or more suitable locations, as aspects of the present disclosure are not limited to any particular manner of data storage.

In the example illustrated in FIG. 1, the electronic device 110 also includes a virtual agent 124. The virtual agent 124 may be programmed to perform any of the functionalities described herein. For example, the virtual agent may be programmed to assist a user in performing any of numerous tasks (e.g., sending messages, placing calls, launching applications, accessing information from the Web, etc.). In performing a task, the virtual agent 124 may interact with the user 102 via the user interface(s) 114. The virtual agent 124 may also interact with the operating system 116 and/or one or more of the application(s) 118, access the user data 120, and/or obtain information from a sensor such as the location sensor 122.

In some embodiments, the virtual agent 124 may be implemented as an application that resides locally on the electronic device 110. In such embodiments, the virtual agent 124 may use the communication interface(s) 112 to communicate with one or more other devices (e.g., the mobile phone 130, the tablet computer 140, etc.), access information from the network storage 160, and/or communicate with one or more of the server(s) 170 via the network(s) 150. In other embodiments, the virtual agent 124 may execute on one or more remote computers (e.g., the server(s) 170) and may be accessible from the electronic device 110 via a web interface, a remote access protocol, or some other suitable technology. In some further embodiments, the virtual agent may be distributed and may execute partially on the device 110 and partially on one or more remote computers.

It should be appreciated that not every device in the system 100 may include a virtual agent. In some embodiments, a virtual agent may receive input from or provide output to a user of a device that has no virtual agent capability. For instance, a first user whose device has no virtual agent capability may communicate with a second user using conventional communication techniques such as Short Message Service (SMS), Instant Messaging (IM), email, telephone call, and the like. A virtual agent running on the second user's device may gain access to the conversation between the first and second users, for example, by accessing messages exchanged between the users and/or by injecting the virtual agent's own messages into the conversation. In this manner, the first user is able to interact with the virtual agent and is considered to be a "user" of the virtual agent, even though the first user's device has no virtual agent capability.

In some embodiments, the virtual agent 124 may be associated with a device (e.g., a mobile phone) that is assumed to primarily have a single user. For example, it may be assumed that the electronic device 110 will be used exclusively by a single user (e.g., the user 102), and the virtual agent 124 may be associated with that particular user by virtue of being associated with the electronic device 110 (e.g., being installed on the electronic device 110 or being associated with an identifier identifying the electronic device 110).

Alternatively, it may be assumed that the electronic device 110 will be shared by multiple users. In such embodiments, the virtual agent 124 may support multiple users of the device in a number of different ways. For example, in some embodiments, the virtual agent 124 may support different users generically (e.g., without regard to the identities of the users). In other embodiments, the virtual agent 124 may be programmed to identify a user who is logged in and use information pertaining to that user (e.g., information from a corresponding user profile) to make decisions. In this manner, the virtual agent 124 may tailor its actions to different users at different times, and may be associated with a particular user (e.g., as identified by a particular user account or profile on the electronic device 110) at any given time. In yet other embodiments, each user may be supported by a different virtual agent, which may be a different instance of the same piece of software or a different piece of software.

In some further embodiments, the virtual agent 124 may be associated directly with a user, regardless of the particular device from which the user invokes the virtual agent 124. For example, the virtual agent 124 may be associated with an identifier identifying a particular user. Other ways of associating the virtual agent 124 with a device and/or a user may also be used, as the present disclosure is not limited to the use of any particular techniques in this respect.

The various components of the system 100 are described above solely for purposes of illustration. The concepts disclosed herein may be implemented in any suitable manner using any suitable device or combination of devices, and do not require any particular component or arrangement of components.

Figure 2:
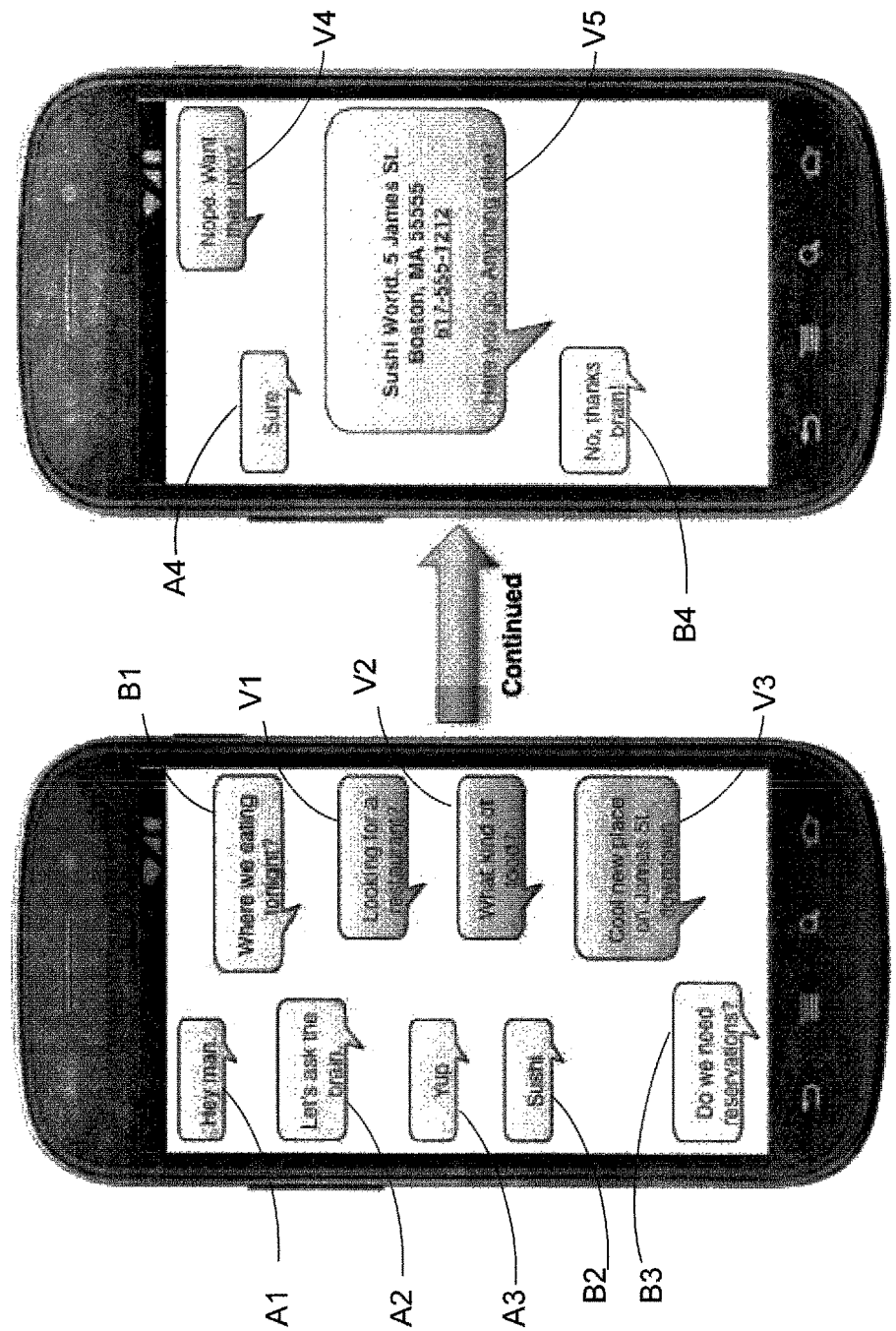
FIG. 2 shows an example of a multiparty conversation from which a virtual agent may be invoked, in accordance with some embodiments of the present disclosure.

FIG. 2 shows an example of a multiparty conversation from which a virtual agent may be invoked, in accordance with some embodiments of the present disclosure. In this example, two users, A and B, engage in a conversation via a messaging application (e.g., SMS or IM) to discuss where to have dinner. User A's contributions to the conversation are labeled A1-4, and user B's contributions are labeled B1-4. A virtual agent is invoked by user A to assist in finding a restaurant, and the virtual agent's contributions are labeled V1-5.

In the example shown in FIG. 2, the conversation commences by user A greeting user B at A1, and user B asking at B1, "Where we eating tonight?" User A does not have a specific restaurant in mind and wishes to ask a virtual agent for a recommendation. In a conventional system, user A would need to switch focus away from the conversation with user B to invoke the virtual agent. By contrast, in accordance with some embodiments of the present disclosure, user A may invoke the virtual agent within the same conversation. In the example shown in FIG. 2, user A invokes a virtual agent at A3 by speaking or typing a designated word or phrase, such as "Let's ask the brain." As a result, the virtual agent is injected into the conversation to interact with users A and B.

Any suitable word or phrase may be used to invoke a virtual agent within a conversation, as the techniques described herein are not limited in this respect. For example, it may be desirable to use a relatively short word or phrase so that it is easy for a user to speak or type the word or phrase. Furthermore, it may be desirable to use a distinctive word or phrase that is easy for a user to remember. Further still, it may be desirable to use an uncommon word or phrase to reduce the likelihood that the user will use the same word or phrase for another reason during a conversation.

In alternative embodiments, a user may invoke the virtual agent in some manner other than speaking or typing a designated word or phrase. Examples of a possible triggering action include, but are not limited to, a designated keystroke or combination of keystrokes, a mouse click at a designated portion of a graphical user interface, a designated touchscreen gesture, a designated button press, etc.

In some further embodiments, a virtual agent may run in the background and monitor a multiparty conversation to determine whether the virtual agent may be able to assist the participants in obtaining certain information and/or making a decision. When the virtual agent determines that it may be able to assist the participants, the virtual agent may proactively prompt one or more of the participants. For example, upon "hearing" user B say, "Where we eating tonight?" the virtual agent may determine that it may be able to assist the participants with information regarding restaurants and may inject itself into the conversation with a brief question, "Looking for a restaurant?" even though it was not explicitly invoked. As an alternative, the virtual agent may separately pop up on a user's screen, rather than directly entering into the multiparty conversation. In either of these types of embodiments, the user may be able to disable the virtual agent for a certain conversation (e.g., by selecting a "Do not disturb" option).

In an embodiment in which a virtual agent monitors a multiparty conversation to determine whether it may be able to assist the participants, the virtual agent may use any suitable technique to analyze at least some portion of the multiparty conversation. Some non-limiting examples using natural language processing techniques are discussed in greater detail below.

In accordance with some embodiments, a virtual agent may be invoked by a user of a remote device even if that remote device does not have virtual agent capabilities and the user is not directly associated with the virtual agent. For instance, in the example shown in FIG. 2, the virtual agent may be invoked on user B's device as a result of receiving the message, "Let's ask the brain," from user A's device. In this manner, any user with whom user B communicates may be able to invoke a virtual agent, even if such a user does not have a device with virtual agent capability and is not otherwise being associated with a virtual agent.

In some embodiments, the virtual agent may be invoked on a server (e.g., one or more of the server(s) 170 shown in FIG. 1) that is remote from both users. For example, in an embodiment in which multiple persons converse with each other via a messaging application (e.g., SMS, IM, email, voice chat, etc.), the virtual agent may be invoked on one or more servers handling the communication traffic associated with the conversation, so that the virtual agent has access to some or all of the communications (e.g., messages) exchanged during the conversation. In some further embodiments, the virtual agent may be invoked on a separate server that receives some or all of the conversation content from a messaging client, a messaging server, and/or any other suitable sources. In any of these embodiments, the virtual agent may be associated with a single user (e.g., user B) in the conversation, but any other participant in the conversation may invoke the virtual agent without being directly associated with the virtual agent. A user may be associated with a virtual agent by subscribing to a virtual agent service in connection with, or separately from, the messaging application, or in any other suitable way, as aspects of the present disclosure are not limited in this respect.

Returning to the example shown in FIG. 2, the virtual agent, once invoked, may be presented to the users as a participant in the multiparty conversation. For instance, the virtual agent may prompt the users for information, for example, by asking questions such as "Looking for a restaurant?" at V1, "What kind of food?" at V2, "Want their info?" at V4, and "Anything else?" at V5. Additionally, the virtual agent may respond to the users with information. In the example shown in FIG. 2, the information includes a recommendation, such as "Cool new place on James St. downtown" at V3, and further information relating to the recommendation, such as the name, address and phone number of the recommended restaurant at V5.

In some embodiments, a virtual agent's contributions (e.g., prompts, information, etc.) in a conversation may be presented in the same manner as contributions from human participants. For instance, the virtual agent may be associated with a user name (e.g., "the Brain"), and anything the virtual agent "says" may be labeled with that user name. Thus, an illustrative interaction between the virtual agent and one or more users may be presented as follows:

User A: Hey man.
User B: Where we eating tonight?
User A: Let's ask the brain.
The Brain: Looking for a restaurant?
User A: Yup.
The Brain: What kind of food?
User B: Sushi.
The Brain: Cool new place on James St. downtown.
User B: Do we need reservations?
The Brain: Nope. Want their info?
User A: Sure.
The Brain: Sushi World, 5 James St., Boston, Mass. 55555, 617-555-1212. Here you go. Anything else?
User B: No, thanks brain!

In embodiments where the virtual agent is presented as a participant in the conversation, the virtual agent's contributions may be presented in a manner that distinguishes the virtual agent from the other participants. This can be done in any suitable way, as the techniques described herein are not limited in this respect. For instance, in the example shown in FIG. 2, the human participants are presented at one part of the screen (e.g., the left-hand side), and the virtual agent is presented at a different part of the screen (e.g., the right-hand side). Additionally, or alternatively, the virtual agent may be presented in other ways that visually distinguish it from the other participants. For example, the virtual agent may be presented using a different color (e.g., red) than is used for human participants (e.g., blue, green, etc.), using speech bubbles of a different shape, using a different font, a different size, or a different textual emphasis (e.g., italics, bold, underline, etc.), or in any other suitable way. In this manner, a user may quickly discern which portions of a conversation come from a virtual agent and which portions come from humans.

In some embodiments, multiple virtual agents may participate in a conversation (e.g., a different virtual agent for each human participant). In such an embodiment, the conversation may be presented in such a way that distinguishes all virtual agents from human participants. For example, all human participants may be presented at one part of a display screen, and all virtual agents may be presented at a different part of the screen. The different virtual agents may be presented in the same manner so that they appear to the human participants as a single participant, or they may be distinguished from each other using different colors, fonts, speech bubble shapes, etc., or in any other suitable way.

Returning again to the example of FIG. 2, the virtual agent may, in some embodiments, be programmed to analyze some or all of a multiparty conversation that took place prior to invocation of the virtual agent. For instance, the virtual agent may be programmed to analyze some or all of the conversation history to determine or interpret how the virtual agent may assist the conversation participants. In the example of FIG. 2, the virtual agent may be programmed to analyze only what was said immediately before the magic phrase "Let's ask the brain," namely, "Where we eating tonight?" In other embodiments, the virtual agent may be programmed to analyze additional or other portions of the conversation history. Examples of such embodiments are discussed in greater detail below in connection with FIG. 4.

The virtual agent may use any suitable technique to determine from some or all of the conversation history how it may assist the participants. In some embodiments, a fixed command grammar may be employed so that the conversation participants must request an action by the virtual agent explicitly by reciting a specific command. In other embodiments, natural language understanding (NLU) techniques are employed so that the users need not use any specific command to inform the virtual agent of what actions the virtual agent may take to assist the participants, and may enable the virtual agent to determine how it may assist by analyzing one or more portions of the conversation that need not be specifically intended to provide information for the virtual agent.

Any NLU techniques may be employed by a virtual agent to determine user intent, as the concepts described herein are not limited to use with any particular NLU techniques. As one non-limiting example, the virtual agent may apply one or more mention detection techniques to map a mention in the text (e.g., "Fenway") to an entity (e.g., the ballpark named "Fenway" or the neighborhood named "Fenway"). As another example, the virtual agent may perform a semantic text analysis that involves tagging one or more portions of text (e.g., "I am hungry") with appropriate semantic labels or categories (e.g., "food" or "restaurant"). As yet another example, the virtual agent may tag different portions of text based on their respective authors. Authorship information may be obtained in various ways depending how the conversation is carried out, for example, based on email addresses, phone numbers (e.g., for telephone call or SMS), user names (e.g., for IM or voice chat), voice recognition (e.g., where multiple persons speak through the same voice channel), etc.

In some embodiments, one or more NLU techniques used by the virtual agent may be statistical (e.g., using a statistical model), so that the analysis may return multiple candidates for user intent with various levels of confidence. The virtual agent may select a candidate user intent with the highest level of confidence. If the virtual agent is not sufficiently confident (e.g., if the highest level of confidence is below a selected threshold), the virtual agent may prompt the user(s) for additional information (e.g., to disambiguate). This prompting may be done in any suitable way. As one non-limiting example, FIG. 2 shows the virtual agent asking the users (at V1) to confirm whether they are looking for a restaurant.

In an embodiment in which the virtual agent monitors a conversation to determine whether to inject itself into the conversation without being explicitly requested by a user, the virtual agent may do so only when it is sufficiently confident that it has identified the correct user intent. In some embodiments, the threshold level of confidence for invoking the virtual agent may be set by a user to allow the user to customize his experience and take advantage of the virtual agent's assistance while reducing unwanted interruptions by the virtual agent.

In some embodiments, the virtual agent may be programmed to obtain information from the users to further define (as opposed to confirm) the task to be performed. This may be done in any suitable way. For example, the virtual agent may ask one or more questions to obtain any information relevant to performing the task. In the example of FIG. 2, the virtual agent asks the users, at V2, "What kind of food?" and user B responds, at B2, "Sushi." This additional piece of information may allow the virtual agent to narrow its search for a restaurant and return a recommendation that is more likely to be accepted by the users. For the example of making a restaurant recommendation, the virtual agent may ask additional questions such as the number of parties expected to be present, preferred time and/or location, price range, etc. Of course, the techniques described herein are not limited to use with a virtual agent that only makes restaurant recommendations, and the virtual agent may be programmed to gather other types of information when performing other types of tasks.

Once the virtual agent has collected sufficient information (e.g., from the conversation history and/or from the virtual agent's interaction with one or more of the users), the virtual agent may perform the task to assist the conversation participants. In the example of FIG. 2, the virtual agent selects a restaurant for the participants and provides a partial recommendation to the them at V3, "Cool new place on James St. downtown." At any point, the participants may end the interaction with the virtual agent, or request further information. For example, at B3, user B asks whether the recommended restaurant requires a reservation. At V4, the virtual agent answers in the negative and asks the participants whether they would like to have specific information about the recommended restaurant. At V5, the virtual agent provides the restaurant name, address and phone number, and asks whether anything else is desired. User B then terminates the interaction at B4 by informing the virtual agent that nothing else is needed.

The specific example of a multiparty conversation shown in FIG. 2 and described above is provided merely for illustration, as the present disclosure is not limited to any of the details of implementation associated with this example. The concepts disclosed herein are capable of any suitable manner of implementation.

While the virtual agent in the example of FIG. 2 receives input from and provides output to the same group of people (i.e., users A and B), aspects of the present disclosure are not so limited. Any one or more of the participants in a multiparty conversation may leave the conversation prior to, at the same time as, or subsequent to invocation of the virtual agent. In one illustrative scenario, after invoking the virtual agent, user A may drop out of the conversation while user B continues to interact with the virtual agent to obtain a restaurant recommendation or perform any other task. As another example, one or more other participants may join the conversation after the virtual agent has been invoked but before the virtual agent has provided information to the conversation participants. In yet another example, the multiparty conversation may conclude before the virtual agent completes the requested task, and the virtual agent may be programmed to provide output to a single one of the conversation participants or to one or more other people who may or may not be among the participants in the conversation from which the virtual agent was invoked.

Furthermore, although the multiparty conversation takes place via SMS in the example of FIG. 2, aspects of the present disclosure are not so limited. In other embodiments, a virtual agent may be invoked from a multiparty conversation that takes place over email. This may be implemented in any suitable way. For example, the virtual agent may be associated with a designated email address, and invoking the virtual agent may include sending an email request to the designated address. In some embodiments, such an email request may be sent by a user who wishes to invoke the virtual agent. In other embodiments, a process (e.g., a background process) may monitor the multiparty conversation and may send the email request in response to detecting a trigger (e.g., in any of the ways discussed above). Once the virtual agent is invoked, the designated address may be added to an email group, so that the virtual agent may receive all subsequent emails sent to the group.

In some further embodiments, a virtual agent may be invoked from a multiparty conversation that takes place over a voice or video conference (e.g., using Voice over Internet Protocol, VoIP). This may be implemented in any suitable way. For example, contributions from human participants may be transcribed in real time by one or more ASR engines, and the virtual agent's contributions may be delivered to the participants using synthesized speech. In some embodiments in which multiple users speak through the same voice channel, any suitable voice recognition or other techniques for distinguishing different users may be used by the virtual agent to determine which user said what during the multiparty conversation.

In some further embodiments, a virtual agent may be invoked from a multiparty conversation that takes place via a conventional telephone call (e.g., over the voice channel on a smartphone, as opposed to the data channel). In such an embodiment, speech data associated with the conversation may be accessed in a number of different ways. As one non-limiting example, the speech data may be accessed from the telephone network and transcribed into text by an ASR engine running on a server (e.g., in the cloud). The transcript may then be provided as input to the virtual agent, which may run on the same server as the ASR engine, or on a different device. In alternative embodiments, one or more of the devices used by the conversation participants may have local ASR engines to directly process speech captured by the devices' microphones. The transcribed text may then be provided to the virtual agent in any suitable manner.

Figure 3:
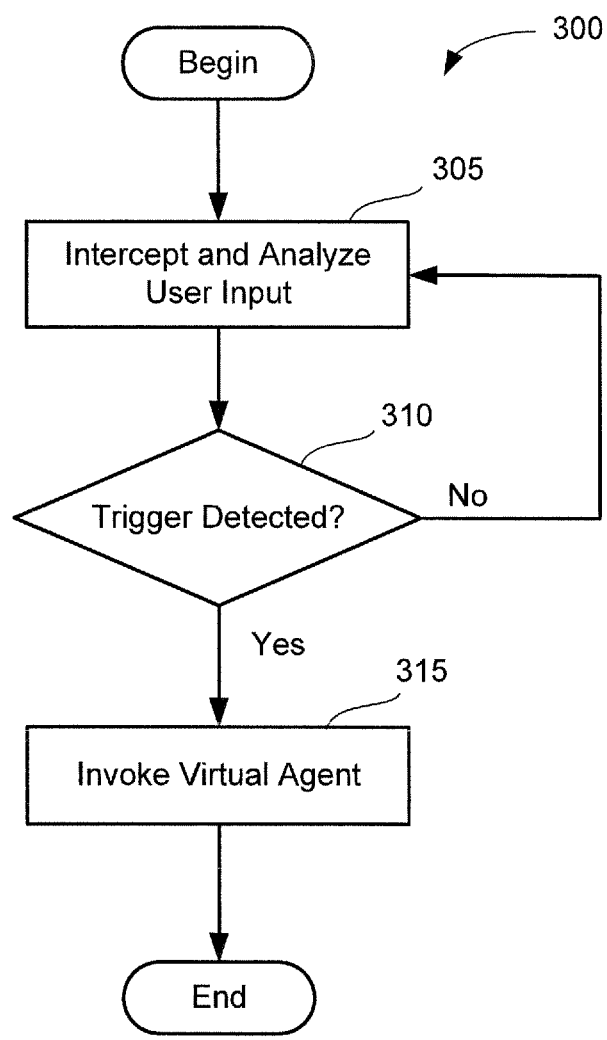
FIG. 3 shows an illustrative process for invoking a virtual agent, in accordance with some embodiments of the present disclosure.

FIG. 3 shows an illustrative process 300 for invoking a virtual agent, in accordance with some embodiments. In one example, the process 300 may inject a virtual agent into a conversation taking place via a messaging application (e.g., SMS, IM, email, voice chat, etc.) as described in connection with the example in FIG. 2. In some embodiments, the process 300 may be a process (e.g., a background process) that is different from the messaging application. Alternatively, the process 300 may be performed by the messaging application. In some further embodiments, the process 300 may be performed by the virtual agent to determine whether to inject itself into the conversation. The virtual agent may be integrated into the messaging application, or may execute as a separate process, as the present disclosure is not limited in this respect. Furthermore, in an embodiment in which the virtual agent is implemented as a software component separate from the messaging application, the virtual agent may interact with the messaging application through some appropriate interface software, which may be provided in any suitable way (e.g., in the same software package as the virtual agent, separately by a third party software vendor, etc.)

At act 305, the process 300 intercepts user input to the messaging application. This may be done in any suitable way. For example, the process 300 may be programmed to intercept input from various types of input devices including, but not limited to, a keyboard, a mouse, and/or a touchscreen. In some embodiments, the process 300 may also be programmed to access speech input by intercepting text output by an ASR engine as a result of transcribing captured user speech.

The process 300 may be programmed to analyze the user input intercepted at act 305 to determine whether the user input includes a trigger to invoke a virtual agent. The trigger may be of any suitable form, such as a designated phrase (e.g., "Let's ask the brain"), a designated key stroke or combination of key strokes, a designated touchscreen gesture, or any other suitable trigger. For example, in some further embodiments, the trigger may be a pattern of events, such as a threshold number of words relating to a particular category (e.g., restaurant, movie, music, etc.) appearing in the conversation over a specified window of time (e.g., 10 seconds, 30 seconds, 1 minute, 10 minutes, 15 minutes, etc.). Other types of triggers may also be used, as aspects of the present disclosure relating to virtual agent invocation are not limited to the use of any particular types of triggers.

In some embodiments, act 305 may be performed by the process 300 on an ongoing basis. That is, the process 300 may continually intercept and analyze user input to the messaging application. If and when a trigger is detected at act 310, the process 300 may proceed to act 315 to invoke the virtual agent. For instance, in some embodiments, the process 300 may cause the virtual agent to be injected into the conversation taking place via the messaging application, so the participants in the conversation can interact with the virtual agent in a natural manner, as if the virtual agent is just another participant in the conversation.

Injecting a virtual agent into a conversation may be done in any suitable way. For instance, in an embodiment in which the virtual agent is integrated into the messaging application, the messaging application may render the virtual agent's contributions to each participant in a way that is similar to how the messaging application renders messages from other participants. In alternative embodiments in which the virtual agent is a separate software component, the virtual agent may provide its contributions to the messaging application through an existing interface provided by the messaging application (e.g., by emulating a client of the messaging application that interacts with a server of the messaging application in any suitable way). For example, in some embodiments, the virtual agent may provide its contributions through the same interface as clients used by human participants. In other embodiments, the messaging application (e.g., a server and/or a client of the messaging application) may be adapted to provide a new interface for receiving the virtual agent's contributions.

It should be appreciated that aspects of the present disclosure relating to invoking a virtual agent are not limited to injecting the virtual agent into a conversation taking place via a messaging application, as the virtual agent may be presented in other ways in alternative embodiments. For example, the virtual agent may pop up on a user's screen, render an audible greeting using a synthesized voice, or present itself in any other suitable way.

Figure 4:
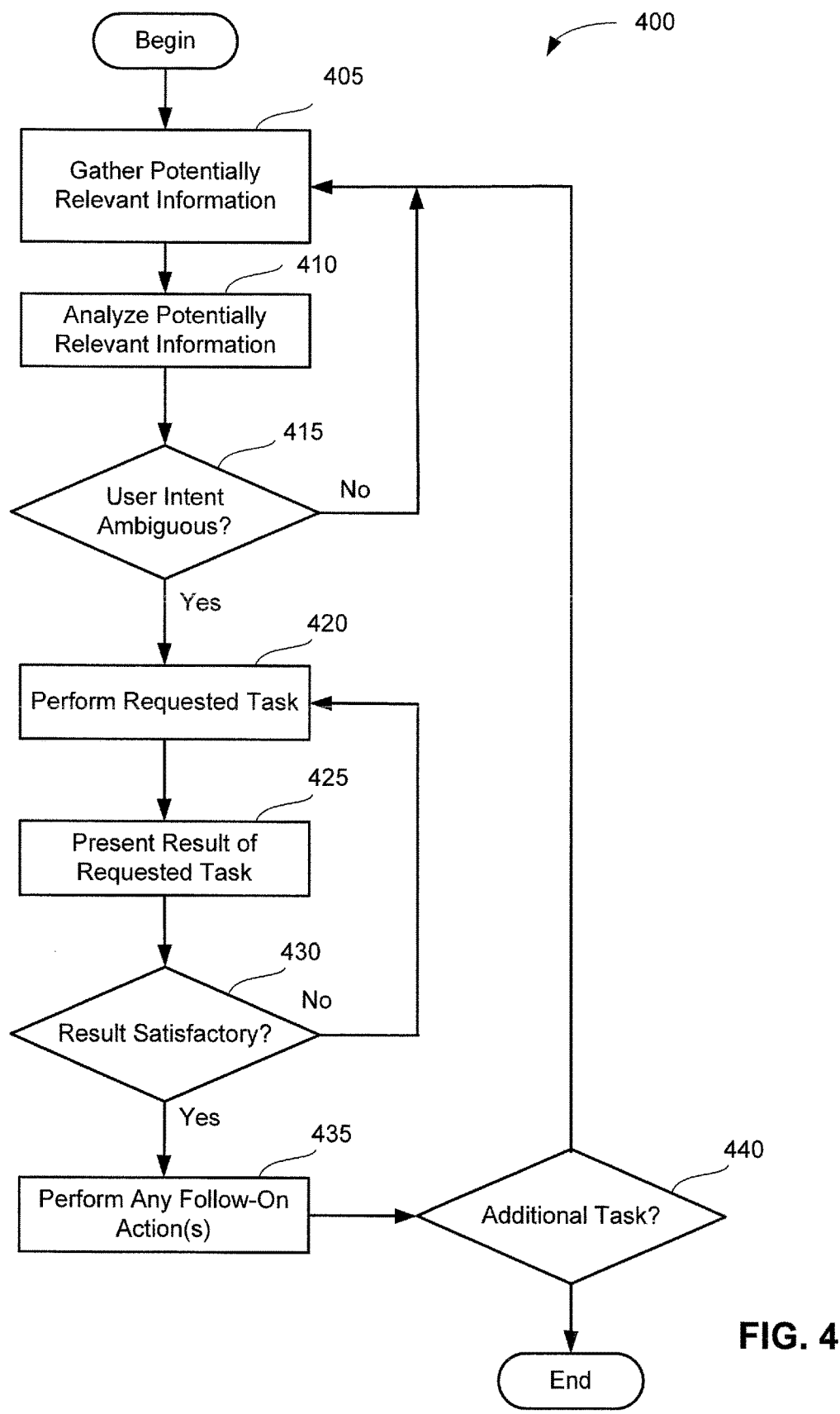
FIG. 4 shows an illustrative process that may be used by a virtual agent to formulate a task to be performed and/or to perform the task, in accordance with some embodiments of the present disclosure.

FIG. 4 shows an illustrative process 400 that may be used by a virtual agent to formulate a task to be performed and/or to perform the task, in accordance with some embodiments. For example, the process 400 may be used by a virtual agent upon invocation to determine or interpret what the virtual agent is likely being asked to do. However, the process 400 may also be used at some later time, as the virtual agent may be asked to perform multiple tasks during the same interaction with one or more users.

At act 405, the virtual agent may gather information that is potentially relevant for determining user intent. In some embodiments, such information may have been provided at the time the virtual agent was invoked to "seed" (i.e., initialize) the virtual agent. For instance, a process that invokes the virtual agent (e.g., in response to detecting a trigger as discussed above in connection with FIG. 3) may pass any suitable information to the virtual agent. Alternatively, the potentially relevant information may be provided by a user after the virtual agent has been invoked, for example, when the user asks the virtual agent to perform a new task. As yet another example, the virtual agent may be programmed to proactively look for information that is potentially relevant.

In some embodiments, the information identified and/or accessed by the virtual agent at act 405 may include a record of a multiparty conversation. For instance, in an embodiment in which the virtual agent is invoked from a multiparty conversation (e.g., as discussed above in connection with FIG. 2), the virtual agent may use the entire conversation history or one or more portions thereof to determine user intent. However, in alternative embodiments the virtual agent may be invoked outside a multiparty conversation and nonetheless use a record of the conversation to determine user intent. For example, the virtual agent may be invoked by a user after the conversation has concluded, or while the conversation is paused. Furthermore, as discussed above, the user invoking the virtual agent need not be a participant in the conversation, as the virtual agent may be invoked by a third party to perform a task for one or more participants in the conversation.

In some further embodiments, the virtual agent may analyze other types of information instead of, or in addition to, a record of a multiparty conversation. For instance, in an embodiment in which the virtual agent is invoked by a process different from the virtual agent itself, that process may pass along any suitable information that may help the virtual agent "understand" the context in which the virtual agent is invoked. As one non-limiting example, a process that invokes the virtual agent in response to detecting a trigger (e.g., as discussed above in connection with FIG. 3) may provide to the virtual agent information describing the trigger that was detected (e.g., a particular pattern of words or phrases that indicates the virtual agent may be able to assist in a particular category such as food, shopping, entertainment, etc.). As another example, the invoking process may provide to the virtual agent the identity of the user who issued the detected trigger and/or the identities of one or more participants in the multiparty conversation.

In some further embodiments, the virtual agent may analyze an activity history of a user who invoked the virtual agent to determine user intent. For instance, the virtual agent may be programmed to analyze content recently accessed by the user (e.g., within one minute, two minutes, three minutes, five minutes, 10 minutes, 15 minutes, etc. prior to invoking the virtual agent) to determine or interpret how the virtual agent may assist the user. As one non-limiting example, upon being invoked by the user to make a restaurant recommendation, the virtual agent may analyze restaurant reviews recently accessed by the user to inform the virtual agent as to what type of food the user may be interested in. Other types of user activities may also be taken into account by the virtual agent, non-limiting examples of which include the user making a particular calendar appointment, calling a particular acquaintance, making a particular purchase, etc.

Returning to FIG. 4, the virtual agent may, at act 410, analyze the potentially relevant information gathered at act 405. This may be done in any suitable way. As one non-limiting example, the virtual agent may be programmed to divide a conversation history obtained at act 405 into different portions and analyze them differently for purposes of determining user intent. For instance, the conversation history may include timestamps that can be used to divide the text into multiple segments corresponding to different windows of time. The windows may have uniform length (e.g., five seconds, 10 seconds, 15 seconds, 20 seconds, 30 seconds, one minute, two minutes, three minutes, five minutes, 10 minutes, 15 minutes, etc.) or variable length (e.g., successively increasing length from most recent to least recent).

In alternative embodiments, the conversation history may be segmented in other ways, for example, based on an amount of text, rather than time. For instance, the segments may have uniform length of some suitable number of words (e.g., 10, 25, 50, 100, 150, 200, 300, 500, etc.) or variable length with some suitable pattern (e.g., successively increasing length from most recent to least recent).

With either type of segmentation discussed above, or any other type of segmentation, the specific parameters (e.g., lengths of time or amounts of text) may be determined in any suitable way, such as by default or as specified by a user. In some embodiments, these parameters may also be selected based on how the conversation was carried out (e.g., shorter segments for voice-based conversations and longer segments for text-based conversations).

In some embodiments, more recent segments of text from the conversation history may receive higher weights in the analysis of act 410 because they may provide more reliable indications of user intent. For example, in one illustrative scenario, the participants may have been discussing for quite some time which movie to watch on Friday night before the conversation turns to which restaurant to go to after the movie, and the virtual agent may be invoked shortly thereafter to recommend a restaurant. Thus, in this scenario, only the most recent segment of the conversation history (e.g., the most recent five seconds or 10 words) may be relevant for the task the virtual agent is asked to perform, and assigning a higher weight to that segment may help the virtual agent formulate the task correctly (i.e., recommending a restaurant, as opposed to recommending a movie).

The weights assigned to various segments of a conversation history may be determined in any suitable way. As one non-limiting example, initial values for the weights may be selected manually and may be adjusted based on performance in actual use (e.g., success rate in correctly identifying user intent). As another example, the weights may be established by statistical analysis of a corpus of conversation histories and manually tagged user intent. As yet another example, only the most recent one or more segments may receive a non-zero weight, so that all other segments are ignored (e.g., to reduce the virtual agent's response time).

In some further embodiments, the virtual agent may assign different weights to different portions of a conversation history based on participant identity. For instance, the virtual agent may be programmed to give higher priority (e.g., by assigning higher weights) to contributions from one or more specified participants (e.g., a user who invoked the virtual agent). Likewise, the virtual agent may be programmed to give lower priority (e.g., by assigning lower weights) to contributions from one or more specified participants. As one non-limiting example, the virtual agent may be programmed to "listen" to only one participant by assigning zero weight to all other participants.

In some embodiments, an activity history of a user who invoked the virtual agent may be segmented (e.g., in a fashion similar to the segmentation of a conversation history as discussed above), and the different segments may similarly be assigned different weights based on whether they are reliable indicators of user intent.

Proceeding to act 415 in FIG. 4, the virtual agent may evaluate whether it has unambiguously identified the task it has been asked to perform. In some embodiments, one or more techniques (e.g., NLU or other artificial intelligence techniques) used by the virtual agent to analyze the potentially relevant information at act 410 may be statistical (e.g., using a statistical model), so that the analysis may return multiple candidates for possible user intent with various levels of confidence. If the virtual agent is not sufficiently confident (e.g., if the highest level of confidence associated with any candidate is below a selected threshold, or if multiple candidates are associated with similarly high confidence levels), the virtual agent may return to act 405 to gather additional information.

Upon returning to act 405, the virtual agent may gather additional information in a number of different ways. In some embodiments, the virtual agent may prompt one or more users for additional information. For example, in an embodiment in which the virtual agent is injected into a conversation, the virtual agent may ask the participants to confirm whether a candidate with the highest level of confidence is indeed the task the virtual agent is asked to perform (e.g., by asking "Looking for a restaurant" in the example shown in FIG. 2), or to choose between two or more candidates with similarly high confidence levels. As another example, the virtual agent may ask the participants an open-ended question, such as "How can I help you?" or "What can I do for you?"

In other embodiments, upon returning to the acts 405 and 410, the virtual agent may analyze information that was previously identified but not analyzed (e.g., for performance reasons). For instance, in an embodiment in which the virtual agent analyzes only the most recent portion of a conversation or activity history at an initial pass, the virtual agent may, upon returning to the acts 405 and 410, access and analyze one or more additional portions of the history that occurred earlier.

Once additional information has been gathered and analyzed at acts 405 and 410, the virtual agent may again evaluate at act 415 whether it has unambiguously identified what it was invoked to do. This process may repeat until the user intent has been unambiguously identified, or until some other stopping condition is reached. Non-limiting examples of stopping conditions include when information available to the virtual agent has been exhausted, when the virtual agent has examined some maximum amount of history (e.g., up to 5 minutes, 10 minutes, 15 minutes, 30 minutes, one hour, two hours, etc. prior to the virtual agent being invoked), when a sufficiently long period of inactivity is found in the history (e.g., 30 minutes, one hour, two hours, etc.), or any other suitable condition that may indicate the virtual is unlikely to find useful information by repeating the acts 405 and 410.

If the virtual agent determines at act 415 that it has unambiguously identified the task it was invoked to perform, it may proceed to act 420 to perform the identified task. The task may include retrieving information, making a recommendation, or taking any other type of action. In some embodiments, the virtual agent may prompt one or more users for additional information to facilitate the performance of the requested task. For example, in an embodiment in which the virtual agent is injected into a conversation, the virtual agent may ask the participants questions to further define the task (e.g., to narrow a search if the number of initial search hits exceed a certain threshold). For instance, in the restaurant search example discussed above, the virtual agent may ask the participants if a particular type of cuisine is preferred, or any other suitable question to refine the restaurant search.

In some embodiments, the virtual agent may prioritize inputs from different users in performing the requested task at act 420. For example, the virtual agent may be programmed to give higher priority to inputs from one or more designated users (e.g., a user who invoked the virtual agent, a user on whose device the virtual agent is running, a user otherwise associated with the virtual agent, etc.). Additionally, or alternatively, the virtual agent may be programmed to give lower priority to inputs from one or more designated users. As one non-limiting example, the virtual agent may be programmed to "learn" from past interactions that certain users are more deferential than others, so that their inputs may be given lower priority.

In some further embodiments, the virtual agent may differentiate between different types of inputs, such as between factual inputs and inputs that relate to preferences. For instance, in some embodiments, the virtual agent may accept factual information provided by any user, but may only take into account, or give priority to, preferences expressed by one or more designated users. The virtual agent may also assign different priorities based on other types of distinctions, such as different levels of emphasis expressed by the users (e.g., higher priority for "must" and lower priority for "maybe").

At act 425, the virtual agent may present the result of the requested task to one or more users (who may or may not be the same as the one or more users who invoked the virtual agent). The result may be of any suitable form, examples of which include a single recommendation that most closely matches the request, a list of top candidates, and one or more pieces of requested information. The result may also be delivered in any suitable manner, such as via email, SMS, IM, voice message, etc., irrespective of how the virtual agent was invoked.

In some embodiments, the virtual agent may receive feedback from one or more users to whom the result was presented, or from any other user. This feedback may be of any suitable form (e.g., approval, disapproval, further suggestions, etc.) and be received in any suitable manner. For example, in an embodiment in which the virtual agent was injected into a conversation, the virtual agent may present the result and receive the feedback within the same conversation. However, feedback may also be received outside the context of the conversation, as aspects of the present disclosure relating to user feedback are not limited to any particular way of communicating the feedback to the virtual agent.

At act 430, the virtual agent may determine, based on the feedback received, whether the users find the result of the requested task satisfactory. If one or more users indicate disapproval, the virtual agent may return to act 420 to perform an update, for example, by making a different recommendation, searching for additional information, etc. In doing so, the virtual agent may take into account the feedback received from the users, so that the update is more likely to produce a satisfactory result.

In some embodiments, the virtual agent may be programmed to discern disagreement among one or more persons. For example, the virtual agent may be programmed to identify conflicting inputs received from different users at act 420 and/or act 425, which may lead the virtual agent to conclude at act 430 that the result is not satisfactory. Upon returning to act 420, the virtual agent may ask the users to resolve the conflict. Alternatively, the virtual agent may be programmed to attempt to steer the users towards agreement.

The virtual agent may attempt to steer the users towards agreement in any suitable way. In some embodiments, the virtual agent may take a vote among the users to resolve a conflict. In other embodiments, the virtual agent may facilitate a negotiation among the users to reach an agreement by applying one or more appropriate tactics. As one non-limiting example, if the users fail to agree on one aspect of a decision (e.g., a location for a gathering), the virtual agent may suggest an alternative that represents roughly the same level of compromise from each user (e.g., a new location that is centrally located with respect to all users). As another example, the virtual agent may suggest that the users take turns to have their respective preferences adopted (e.g., French restaurant this week and Italian restaurant next week). As yet another example, the virtual agent may let each user control a different aspect of a decision. Other negotiation tactics may also be used, as aspects of the present disclosure relating to negotiating agreement among multiple users are not limited to the use of any particular negotiation tactic.

If the virtual agent determines at act 430 that the requested task has been performed satisfactorily, the virtual agent may proceed to act 435 to perform any follow-on action(s) associated with the task. In some embodiments, such follow-on actions may be unsolicited, but may be performed to improve user experience or for some other reason. As one non-limiting example, after the virtual agent's recommendation is accepted, the virtual agent may remind one or more of the users of any necessary or desirable next steps, such as creating a calendar entry, sending an invitation, making an reservation, purchasing a ticket, arranging transportation, etc. The virtual agent may also request permission from a user to perform one or more of these actions on behalf of the user.

After completing any follow-on action(s) at act 435, the virtual agent may proceed to act 440 to ask whether the virtual agent may assist in performing an additional task. If the virtual agent receives a positive response at act 440, the virtual agent may return to act 405 to attempt to identify the new task. If the virtual agent receives a negative response at act 440, the virtual agent may terminate the interaction.

While the various acts of the process 400 are described in detail above, it should be appreciated that such descriptions are provided solely for purposes of illustration. The concepts disclosed herein are not limited to being implemented in the manner described above, nor to any other particular implementation.

As discuss above, the inventors have recognized and appreciated some benefits of saving a record of an interaction between a virtual agent and one or more users. Such a record (e.g., a receipt) may store any suitable information. In some embodiments, a receipt may store information that a user may wish to recall in the future, such as the outcome of a task performed by the virtual agent (e.g., a recommendation made by the virtual agent). As one non-limiting example, a user may wish to recall where he had dinner with a particular friend during a particular time frame. If the restaurant was recommended by a virtual agent, the user may be able to search for a receipt based on the friend's name and/or the relevant time frame. Retrieving such information would not have been possible if no records were kept, or would have been more time consuming if the user had to search through a large volume of information (e.g., conventionally stored emails) that was not indexed in a way that would facilitate this type of retrieval.

In other embodiments, a receipt may store information that may be used by the virtual agent to facilitate a future interaction, such as preference information for one or more persons, factual information regarding persons, products, businesses, etc., or any other information provided by the one or more users or otherwise obtained by the virtual agent in connection with the interaction. Thus, the records may be part of a body of knowledge accumulated by the virtual agent to continually improve its performance.

In some embodiments in which the virtual agent is injected into a conversation, a full conversation history may be stored including everything contributed by every human participant as well as the virtual agent. Such a history may be stored by the messaging application via which the conversation took place (e.g., SMS string, IM log, email string, voice chat transcript, etc.). Alternatively, the history may be stored separately by the virtual agent or some other suitable process.

In other embodiments, a partial conversation history may instead be stored (e.g., to save storage space or for any other reason). For example, the record may include only the portion(s) of the history from one or more specified time periods (e.g., subsequent to the invocation of the virtual agent), only the portion(s) contributed by the virtual agent and/or one or more specified users, only the portion(s) relating to one or more specified topics, or only the portion(s) delineated in some other suitable way.

In some further embodiments, a receipt may be stored for an interaction between a virtual agent and one or more users. Unlike a conversation history, which is limited to information communicated during a conversation, a receipt may include additional information, such as information obtained by the virtual agent to formulate a task and/or perform the task, but not expressly communicated to the one or more users. Furthermore, a receipt may be more concise than a conversation history in one or more aspects, and may include only information that is deemed salient or relevant. Further still, as discussed in greater detail below, a receipt is not limited to information relating to the past, and may include information relating to one or more ongoing activities.

FIG. 5 shows an illustrative data store 500 (e.g., a database or some other suitable data store) for storing receipts for virtual agent interactions, in accordance with some embodiments of the present disclosure. In this example, a receipt includes multiple data fields, such as "Receipt ID" field 505, "Date/Time" field 510, "People" field 515, "Category" field 520, "Outcome" field 525, "Status" field 530, "Reviews" field 535, etc. Other data fields may also be stored in addition to, or instead of, those show in FIG. 5, as aspects of the present disclosure relating to storing receipts are not limited to the particular types of information stored in the illustrative receipt data store 500.

The "Receipt ID" field 505 may store an alphanumerical identifier chosen by the virtual agent or some other process that stores receipts, a meaningful name chosen by a user, or any other suitable identifier. The "Date/Time" field 510 may indicate when a receipt was created, when the virtual agent was invoked, or some other relevant point in time. The "People" field 515 may list the person(s) who invoked the virtual agent, with whom the virtual agent communicated, whose input was taken into account by the virtual agent, for whom the virtual agent made a recommendation, and/or any other relevant person(s). The "Category" field 520 may indicate one or more topics or domains to which the particular virtual agent interaction relates, such as dining, gift, sports, travel, etc. The "Outcome" field 525 may record a result of a task performed by the virtual agent, such as information retrieved by the virtual agent, a recommendation made by the virtual agent, etc.

The "Status" field 530 may include information relating to one or more ongoing activities. For example, in an embodiment in which a virtual agent performed a task relating to a future event (e.g., by retrieving information or making a recommendation), the "Status" field may store any relevant updates for the event. For instance, in the example shown in FIG. 5, the event may be marked "Completed," "Canceled," "In Progress," or with any other suitable status indicator. Although not shown, the "Status" field may in some embodiments also include more detailed information, such as schedule or venue updates, a list of invitees with confirmation information (e.g., accepted, rejected, tentatively accepted, changes proposed, etc.), a to-do list in preparation for the event, etc.

In some further embodiments, information stored in the "Status" field or any other field in the receipt may be updated in real time to keep a relevant person apprised of the most recent developments. As one non-limiting example, for a social gathering (e.g., a dinner party as discussed throughout this disclosure), an Estimated Time of Arrival (ETA) may be maintained for one or more attendees and made available to a relevant person who may (although need not) also be an attendee. The ETA may be calculated based at least in part on a current location of the respective attendee and the location of the gathering (e.g., the restaurant recommended by the virtual agent). In this manner, any attendee may find out when to expect another attendee by calling up a most up-to-date copy of the receipt. As another example, the receipt may include a weather or traffic map of an area of interest (e.g., near the location of a gathering), and may be updated periodically.

Updates to a receipt may be performed at any suitable time and in any suitable manner. In some embodiments, information may be pulled periodically (e.g., at a default or user-specified frequency) from one or more sources (e.g., location information from a mobile device of an attendee, event scheduling information from a web site, weather or traffic information from a server, etc.) In other embodiments, information may be pulled only when requested by a user. In some further embodiments, updates may be triggered upon notification that new information has become available. Furthermore, in an embodiment in which receipts are stored on a remote server (e.g., in the cloud), updates to a receipt may be automatically pushed to a user's device, or may be pulled from the server by the user's device as requested by the user.

In some embodiments, a receipt may include information provided by at least one person by way of comment or feedback. In the example shown in FIG. 5, the "Reviews" field 535 stores reviews of recommendations made by the virtual agent. Such a review may be provided by a person who may or may not have participated in the interaction that led to the recommendation. As one non-limiting example, receipt no. 1 includes a review from a person C, who did not participate in the interaction between the virtual agent and users A and B during which the virtual agent recommended a restaurant, but attended the dinner with user B at the recommended restaurant. On the other hand, user A participated in the interaction with the virtual agent, but did not attend the dinner or chose not to leave a review. As another example, receipt no. 2 includes a review by a person D for a birthday present from A to D, where the person D did not participate in the interaction between the virtual agent and user A during which the virtual agent recommended a snowboard as the present.

It should be appreciated that the receipt data store 500 is shown in FIG. 5 and described above solely for purposes of illustration. Aspects of the present disclosure relating to storing receipts are not limited to the particular arrangement of information shown in FIG. 5. For example, while storing the receipts in a database may facilitate subsequent retrieval of information, a database is not required. The receipts may be stored in other types of data stores.

In some embodiments in which a receipt for a virtual agent interaction is stored separately from a full conversation history, a link may be created between the receipt and the full history to indicate that both relate to the same interaction with the virtual agent. As one non-limiting example, the virtual agent may store a receipt for an interaction with a link to a conversation history separately stored by a messaging application via which the interaction took place. This may facilitate the user retrieving information relating to past interactions with the virtual agent. For instance, in some embodiments, the user may be able to search the receipts to identify a particular interaction and use the link stored with the identified receipt to retrieve the corresponding full conversation history. Because full conversation histories may contain more noise (i.e., irrelevant information) than receipts, it may be more efficient and/or accurate to search the receipts as opposed to the full conversation histories. In some further embodiments, a virtual agent may interact with one or more users multiple times regarding the same task, and may use a link from a receipt for the task to access a previous conversation history related to the task.

In some further embodiments, a receipt for a virtual agent interaction may be used to communicate information to a relevant person. For example, a user may interact with a virtual agent to request a recommendation for one or more persons (e.g., for a social gathering), and may give each relevant person access to a receipt of the interaction to inform him of the specifics of the recommendation (e.g., location, time, dress code, attendee list, etc.). This may be done in any suitable manner, for example, by sending a copy of the receipt to the person, or a link to the receipt to allow the person to view the receipt at any time. Furthermore, one or more suitable access control mechanisms (e.g., an access control list) may be implemented in some embodiments to ensure that only authorized users may view the receipt.

In some further embodiments, one or more access control mechanisms may also be implemented to allow only certain persons to edit a receipt. In the dining example discussed above in connection with receipt no. 1 in FIG. 5, the virtual agent may be associated with user A (e.g., installed on user A's device. accessible to user A through a service subscription, etc.), so that user A may edit any data field in the receipt. Additionally, in some embodiments, an authorized user may give permission to one or more other persons to edit one or more fields in a receipt. For example, an authorized user (e.g., user A in the example shown in FIG. 5) may give permission to one or more relevant persons (e.g., the person D) to leave a review for a recommendation made by the virtual agent (e.g., birthday present for D). In some further embodiments, an authorized user and/or a person given permission to edit a receipt may indicate whether and with whom a particular piece of information may be shared. For instance, for receipt no. 1 in the example shown in FIG. 5, the person C may indicate that the review for the restaurant is private and can be viewed only by user A and/or some specified set of persons.

Receipts for virtual agent interactions may be used in any other suitable way, as the techniques disclosed herein are not limited to any particular uses for receipts. In an illustrative scenario, a user may wish to forward the virtual agent's recommendation to a friend who did not participant in the original interaction, nor is in any way related to the recommendation made by the virtual agent. The user may do so simply by sending a copy of the receipt or one or more relevant portions thereof to the friend. In another illustrative scenario, a user may wish to perform a task similar to a task performed in the past, but with one or more variations. As with a full conversation record, the user may, in some embodiments, modify a receipt of a previous interaction (e.g., by adding, modifying, and/or removing information) and provide the modified receipt to the virtual agent to request the new task, without having to recreate the interaction or otherwise manually input all information desired to be provided to the virtual agent.

In some further embodiments, information may be gleaned from a receipt for a virtual agent interaction and used to update a person's profile. Non-limiting examples of such information include preferences that were expressed by the person in a conversation history and used by the virtual agent to formulate a task to be performed or to perform the task, preferences or decisions communicated to the virtual agent by the person, any information requested by the person (e.g., to facilitate making a certain decision), any information about the person but provided by one or more other people, any type of feedback or comment provided by the person (e.g., a review of a recommendation made by the virtual agent), or any other suitable information regarding the person. The person for whom a profile is established and updated may be a user of the virtual agent (e.g., a user on whose device the virtual agent is installed, a user to whom the virtual agent is provided through a subscription service, a user otherwise associated with the virtual agent, etc.), or may be any other person (e.g., the associated user's friend, relative, co-worker, etc.)

Figure 6:
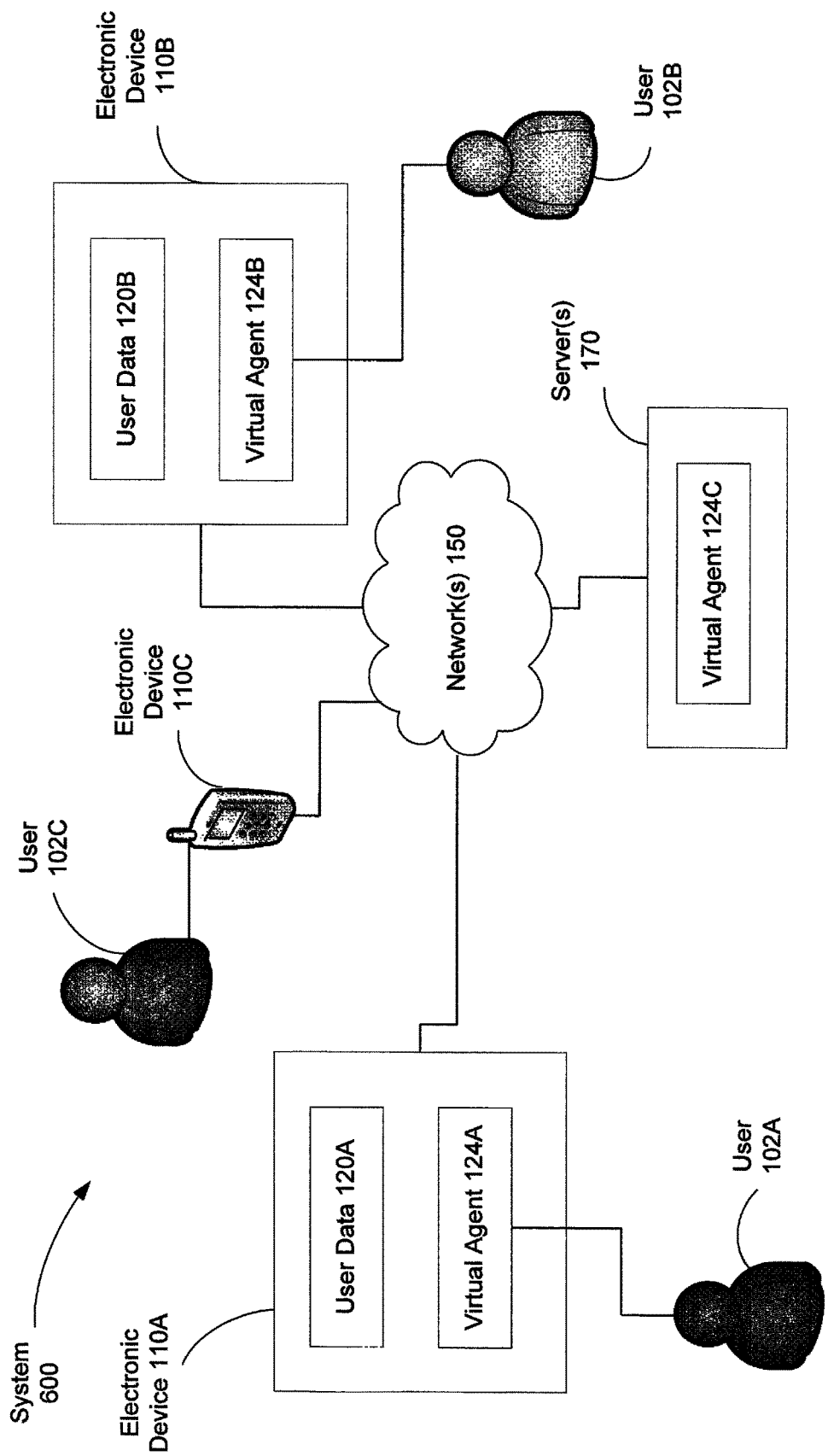
FIG. 6 shows an illustrative system in which multiple virtual agents interact with each other in formulating a task to be performed and/or in performing the task, in accordance with some embodiments of the present disclosure.

FIG. 6 shows an illustrative system 600 in which multiple virtual agents interact with each other in formulating a task to be performed and/or in performing the task for a group of one or more users, in accordance with some embodiments. In this example, virtual agents 124A and 124B are associated, respectively, with users 102A and 102B. These virtual agents may execute on different devices (e.g., electronic devices 110A and 110B, respectively) associated with the respective users. However, different devices are not required, as the virtual agents may in alternative embodiments execute on the same device (e.g., a server in the cloud) and may be associated with the respective users in some other suitable manner (e.g., based on the users' accounts, profiles, identifiers, etc.). An example of such a remotely executing virtual agent is also shown in FIG. 6, where user 102C is associated (e.g., via a service subscription) with virtual agent 124C executing on the server(s) 170. In this manner, the user 102C may access the virtual agent from any suitable device capable of communicating with the server(s) 170, such as the electronic device 110C.

In some embodiments, a virtual agent (e.g., the virtual agent 124A in the example of FIG. 6) may have access to various types of information regarding an associated user (e.g., user 102A), such as contact information (e.g., physical addresses, phone numbers, email and/or other virtual addresses, etc.), location information (e.g., present location, recently visited locations, frequently visited locations, etc.), preference information (e.g., gleaned from activity histories, reviews, etc.), and/or any other suitable information. In some embodiments, some of all of this information may be stored locally on the associated user's device (e.g., user data 120A stored on the electronic device 110A in the example of FIG. 6). In some further embodiments, some or all of the information may be stored on a remote server (e.g., in the cloud), and the virtual agent may be given the appropriate authorization (e.g., based on storage location of the information, user identifier, access credentials, etc.) to access the information via one or more networks (e.g., the network(s) 150 shown in FIG. 6).

In some further embodiments, virtual agents associated with different users may be programmed to share information with each other. The sharing of information may be unconstrained. However, in some embodiments, the sharing may be done within constraints set by the respective users. Such constraints may be established for privacy reasons or any other reason. For instance, in the example shown in FIG. 6, the user 102A may instruct the virtual agent 124A that certain information (e.g., contact information, location information, preference information, etc.) may be shared only with a virtual agent associated with a user within a specified group of people (e.g., a trusted circle of friends), so that before sharing such information with another virtual agent (e.g., the virtual agent 124B), the virtual agent 124A must verify that the user associated with the other virtual agent (e.g., the user 102B) belongs to the specified group. Furthermore, different types of access policies may be specified for different types of information and/or different groups of people. For example, information designated as "public" may be accessible to everyone, while information designated as being related to a certain organization (e.g., sports team, church, school, etc.) may be accessible only to people affiliated with that organization.

In some further embodiments, multiple virtual agents may be programmed to collaborate with each other in making a recommendation, regardless of how much information the virtual agents share with each other. For instance, the virtual agents may be programmed to negotiate with each other to reach a compromise based on the respective users' preferences and/or constraints. In conducting such a negotiation, a virtual agent may make a proposal to other virtual agents, or accept or reject a proposal made by another virtual agent, with or without divulging to the other virtual agents the underlying information used by the virtual agent to make, accept, or reject the proposal.

As one non-limiting example, the users 102A-C shown in FIG. 6 may wish to find a mutually convenient time to hold a telephone conference and direct the respective virtual agents 124A-C to make an appointment. Rather than disclosing to each other detailed information regarding the respective users' calendars, the virtual agents 124A-C may engage in a negotiation. For example, the virtual agent 124A may send one or more proposed times to the virtual agents 124B-C, which may accept, decline, or make alternative proposals on behalf of their respective users. In some embodiments, such a negotiation may take place in a manner that is transparent to the users (e.g., in the background). For instance, in the example shown in FIG. 6, the user 102A need not be aware that the users 102B-C are assisted by virtual agents. Thus, from the perspective of the user 102A, there may appear to be only one virtual agent (e.g., the virtual agent 124A).

In some embodiments, multiple virtual agents may assist their respective users in performing other types of actions. As one non-limiting example, the virtual agents may coordinate updates to a receipt associated with an interaction. For example, each user may enter a review into the receipt through the respective virtual agent.

It should be appreciated that the specific arrangements of users and virtual agents described above in connection with FIG. 6 are merely illustrative. The concepts disclosed herein are not limited to being implemented in the manner described above, nor to any other particular implementation. For instance, in some embodiments, multiple virtual agents running on different devices may interact with each other in formulating a task to be performed and/or in performing the task, irrespective of whether the task is performed for a single user or for multiple users. As one non-limiting example, a virtual agent running on a user device may interact with a virtual agent running on a server (e.g., in the cloud). This may be done in any suitable way, such as by forwarding information to and receiving a recommendation from the server-side virtual agent. The server-side virtual agent may interact with a single client-side virtual agent (e.g., when making a recommendation for a single user) or multiple client-side virtual agents (e.g., when making a recommendation for multiple users), as aspects of the present disclosure relating to multiple virtual agents collaborating with each other are not limited to any particular arrangement among the virtual agents.

Figure 7:
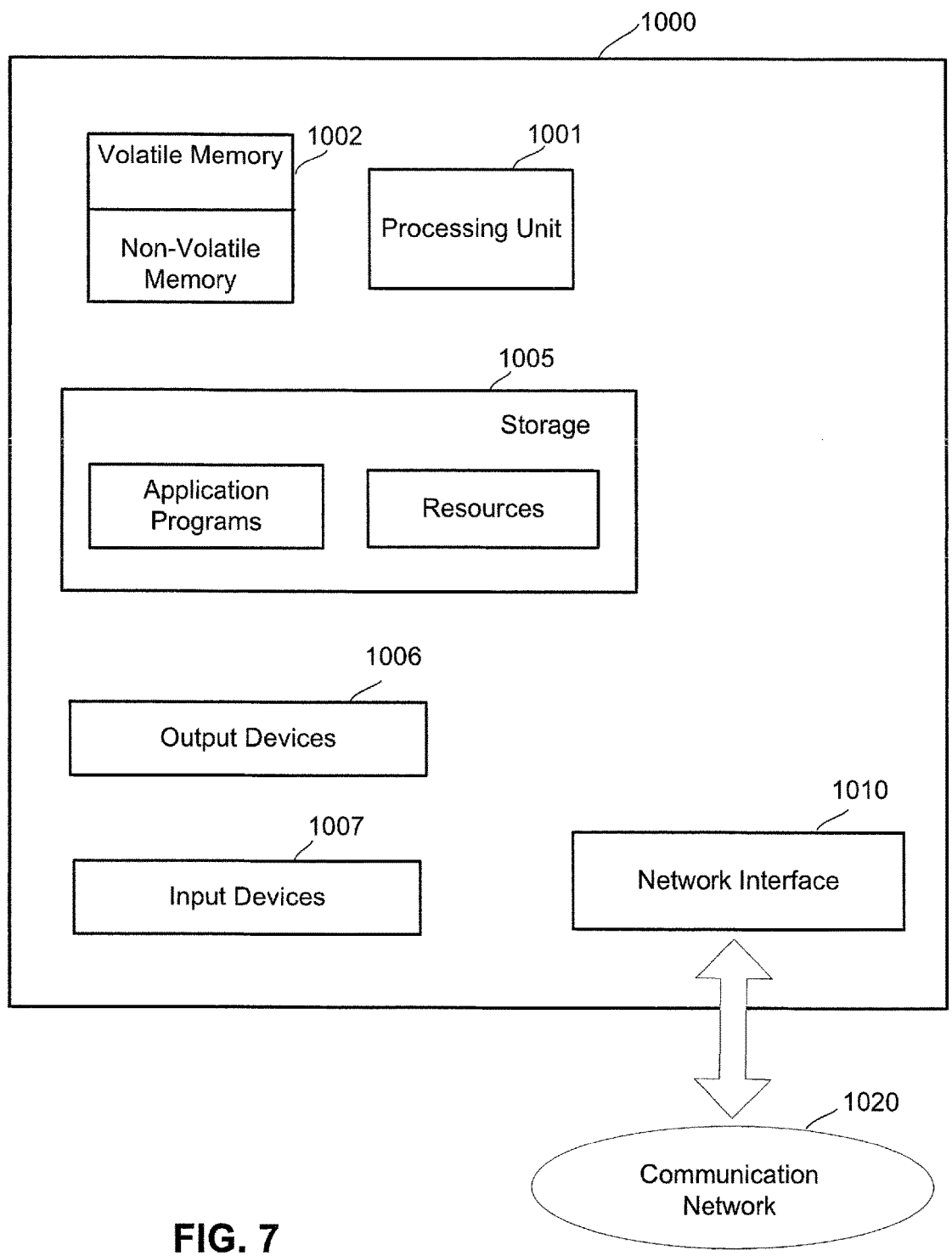
FIG. 7 shows, schematically, an illustrative computer on which various inventive aspects of the present disclosure may be implemented, in accordance with some embodiments.

FIG. 7 shows, schematically, an illustrative computer 1000 on which any aspect of the present disclosure may be implemented. For example, the computer 1000 may be a mobile device on which any of the features described in connection with the illustrative device 110 shown in FIG. 1 may be implemented. The computer 1000 may also be used in implementing a server (e.g., the illustrative server(s) 170 shown in FIG. 1) or some other component of a system in which any of the concepts described herein may be implemented.

As used herein, a "mobile device" may be any computing device that is sufficiently small so that it may be carried by a user (e.g., held in a hand of the user). Examples of mobile devices include, but are not limited to, mobile phones, pagers, portable media players, e-book readers, handheld game consoles, personal digital assistants (PDAs) and tablet computers. In some instances, the weight of a mobile device may be at most one pound, one and a half pounds, or two pounds, and/or the largest dimension of a mobile device may be at most six inches, nine inches, or one foot. Additionally, a mobile device may include features that enable the user to use the device at diverse locations. For example, a mobile device may include a power storage (e.g., battery) so that it may be used for some duration without being plugged into a power outlet. As another example, a mobile device may include a wireless network interface configured to provide a network connection without being physically connected to a network connection point.

In the embodiment shown in FIG. 7, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 7. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 7, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. An apparatus comprising:
   at least one memory storing one or more executable instructions; and
   at least one hardware processor coupled to the at least one memory and programmed by the one or more executable instructions to implement at least one virtual agent, the at least one virtual agent being programmed to:
   analyze a record of a multiparty conversation to identify a request for a recommendation for a social gathering to be attended by a plurality of persons;
   identify a relationship between at least two persons of the plurality of persons;
   use the relationship between the at least two persons to determine one or more criteria for selecting a recommendation for the social gathering to be attended by the plurality of persons;
   use the one or more criteria to search a plurality of options and identify at least one option matching the one or more criteria;
   engage in an interaction with a user to output the at least one option as a joint recommendation for the plurality of persons based at least in part on the relationship between the at least two persons;
   store a receipt in association with the user interaction between the at least one virtual agent and the user, wherein:
   the receipt comprises the at least one option recommended by the at least one virtual agent for the social gathering to be attended by the plurality of persons;
   the receipt is accessible to the plurality of persons and is different from a communication transcript of the user interaction; and
   the receipt further comprises a link for accessing the communication transcript of the user interaction; and at a subsequent time, update the receipt based on current information regarding one or more of the plurality of persons.

2. The apparatus of claim 1, wherein the at least one virtual agent is programmed to:
   monitor the multiparty conversation as the multiparty conversation is ongoing to identify the request for a recommendation for the social gathering to be attended by the plurality of persons;
   access information outside the multiparty conversation; and
   identify the relationship between the at least two persons based at least in part on the information outside the multiparty conversation.

3. The apparatus of claim 1, wherein the recommendation relates to a location for the social gathering to be attended by the plurality of persons, and wherein the at least one virtual agent is further programmed to:
   obtain GPS coordinates indicative of current locations for the plurality of persons, the current locations comprising at least two different locations; and
   select, as the at least one option to be output as the joint recommendation, a recommended location that is at most a threshold distance away from each of the at least two different locations.

4. The apparatus of claim 1, wherein the current information regarding the one or more of the plurality of persons comprises GPS coordinates indicative of a current location of the one or more of the plurality of persons, and wherein the virtual agent is further programmed to:
   determine a current estimated time of arrive (ETA) for the one or more of the plurality of persons based on a location of the at least one option recommended for the social gathering and the current location of the one or more of the plurality of persons, wherein the receipt is updated with the current ETA for the one or more of the plurality of persons.

5. The apparatus of claim 1, wherein the at least two persons comprise a first person, and wherein the at least one virtual agent is programmed to identify the relationship between the at least two persons at least in part by accessing information stored in a user profile of the first person.

6. The apparatus of claim 1, wherein the at least one virtual agent is programmed to identify the relationship between the at least two persons at least in part by accessing information collected from at least one social networking service provider.

7. The apparatus of claim 1, wherein the at least one virtual agent is programmed to identify the relationship between the at least two persons at least in part by querying at least one third person.

8. A method performed by at least one hardware processor implementing at least one virtual agent, the method comprising acts of:
   analyzing a record of a multiparty conversation to identify a request for a recommendation for a social gathering to be attended by a plurality of persons;
   identifying a relationship between at least two persons of the plurality of persons;
   using the relationship between the at least two persons to determine one or more criteria for selecting a recommendation for the social gathering to be attended by the plurality of persons;
   using the one or more criteria to search a plurality of options and identify at least one option matching the one or more criteria;
   engaging in an interaction with a user to output the at least one option as a joint recommendation for the plurality of persons based at least in part on the relationship between the at least two persons;
   storing a receipt in association with the user interaction between the at least one virtual agent and the user, wherein:
      the receipt comprises the at least one option recommended by the at least one virtual agent for the social gathering to be attended by the plurality of persons;
      the receipt is accessible to the plurality of persons and is different from a communication transcript of the interaction; and
      the receipt further comprises a link for accessing the communication transcript of the user interaction; and
   at a subsequent time, updating the receipt based on current information regarding one or more of the plurality of persons.

9. The method of claim 8, wherein the method further comprises:
   monitoring the multiparty conversation as the multiparty conversation is ongoing to identify the request for a recommendation for the social gathering to be attended by the plurality of persons; and
   accessing information outside the multiparty conversation, wherein the relationship is identified based at least in part on the information outside the multiparty conversation.

10. The method of claim 8, wherein the recommendation relates to a location for the social gathering to be attended by the plurality of persons, and wherein the method further comprises:
   obtaining GPS coordinates indicative of current locations for the plurality of persons, the current locations comprising at least two different locations; and
   selecting, as the at least one option to be output as the joint recommendation, a recommended location that is at most a threshold distance away from each of the at least two different locations.

11. The method of claim 8, wherein the current information regarding the one or more of the plurality of persons comprises GPS coordinates indicative of a current location of the one or more of the plurality of persons, and wherein the method further comprises:
   determining a current estimated time of arrive (ETA) for the one or more of the plurality of persons based on a location of the at least one option recommended for the social gathering and the current location of the one or more of the plurality of persons, wherein the receipt is updated with the current ETA for the one or more of the plurality of persons.

12. The method of claim 8, wherein the at least two persons comprise a first person, and wherein identifying the relationship between the at least two persons comprises accessing information stored in a user profile of the first person.

13. The method of claim 8, wherein identifying the relationship between the at least two persons comprises accessing information collected from at least one social networking service provider.

14. The method of claim 8, wherein identifying the relationship between the at least two persons comprises querying at least one third person.

15. At least one computer-readable storage device having encoded thereon instructions that, when executed by at least one hardware processor, perform a method for implementing at least one virtual agent, the method comprising acts of:

analyzing a record of a multiparty conversation to identify a request for a recommendation for a social gathering to be attended by a plurality of persons;

identifying a relationship between at least two persons of the plurality of persons;

using the relationship between the at least two persons to determine one or more criteria for selecting a recommendation for the social gathering to be attended by the plurality of persons;

using the one or more criteria to search a plurality of options and identify at least one option matching the one or more criteria;

engaging in an interaction with a user to output the at least one option as a joint recommendation for the plurality of persons based at least in part on the relationship between the at least two persons;

storing a receipt in association with the user interaction between the at least one virtual agent and the user, wherein:
  the receipt comprises the at least one option recommended by the at least one virtual agent for the social gathering to be attended by the plurality of persons;
  the receipt is accessible to the plurality of persons and is different from a communication transcript of the interaction; and
  the receipt further comprises a link for accessing the communication transcript of the user interaction; and at a subsequent time, updating the receipt based on current information regarding one or more of the plurality of persons.

16. The at least one computer-readable storage device of claim 15, wherein the method further comprises:
  monitoring the multiparty conversation as the multiparty conversation is ongoing to identify the request for a recommendation for the social gathering to be attended by the plurality of persons; and
  accessing information outside the multiparty conversation, wherein the relationship is identified based at least in part on the information outside the multiparty conversation.

17. The at least one computer-readable storage device of claim 15, wherein the recommendation relates to a location for the social gathering to be attended by the plurality of persons, and wherein the method further comprises:
  obtaining GPS coordinates indicative of current locations for the plurality of persons, the current locations comprising at least two different locations; and
  selecting, as the at least one option to be output as the joint recommendation, a recommended location that is at most a threshold distance away from each of the at least two different locations.

18. The at least one computer-readable storage device of claim 15, wherein the current information regarding the one or more of the plurality of persons comprises GPS coordinates indicative of a current location of the one or more of the plurality of persons, and wherein the method further comprises:
  determining a current estimated time of arrive (ETA) for the one or more of the plurality of persons based on a location of the at least one option recommended for the social gathering and the current location of the one or more of the plurality of persons, wherein the receipt is updated with the current ETA for the one or more of the plurality of persons.

19. The at least one computer-readable storage device of claim 15, wherein the at least two persons comprise a first person, and wherein identifying the relationship between the at least two persons comprises accessing information stored in a user profile of the first person.

20. The at least one computer-readable storage device of claim 15, wherein identifying the relationship between the at least two persons comprises accessing information collected from at least one social networking service provider.

* * * * *